United States Patent
Lee et al.

(10) Patent No.: US 12,483,721 B2
(45) Date of Patent: Nov. 25, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Sooyeon Lee, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 18/025,139

(22) PCT Filed: Aug. 31, 2021

(86) PCT No.: PCT/KR2021/011680
§ 371 (c)(1),
(2) Date: Mar. 7, 2023

(87) PCT Pub. No.: WO2022/055167
PCT Pub. Date: Mar. 17, 2022

(65) Prior Publication Data
US 2023/0328270 A1 Oct. 12, 2023

(30) Foreign Application Priority Data
Sep. 9, 2020 (KR) .......................... 10-2020-0115526

(51) Int. Cl.
*H04N 19/52* (2014.01)
*H04N 19/119* (2014.01)
(Continued)

(52) U.S. Cl.
CPC .......... *H04N 19/52* (2014.11); *H04N 19/119* (2014.11); *H04N 19/597* (2014.11);
(Continued)

(58) Field of Classification Search
CPC .... H04N 19/52; H04N 19/119; H04N 19/597; H04N 19/124; H04N 19/70; H04N 19/96
See application file for complete search history.

(56) References Cited

U.S. PATENT DOCUMENTS 6,349,297 B1 * 2/2002 Shaw .................. H04N 21/426
8,559,518 B2 * 10/2013 Chappalli ............. H04N 5/145
375/240.16
(Continued)

FOREIGN PATENT DOCUMENTS

JP 2020022116 A 2/2020
KR 20200038534 A 4/2020
(Continued)

OTHER PUBLICATIONS

Abe Kiyofumi translation of WO 2018097078 A1 Nov. 20, 2017 (Year: 2017).*
(Continued)

*Primary Examiner* — Zaihan Jiang
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream containing the point cloud data. In addition, a point cloud data transmission device according to embodiments may comprise: an encoder for encoding point cloud data; and a transmitter for transmitting a bitstream containing the point cloud data.

21 Claims, 32 Drawing Sheets

(51) Int. Cl.
*H04N 19/597* (2014.01)
*H04N 19/124* (2014.01)
*H04N 19/70* (2014.01)
*H04N 19/96* (2014.01)

(52) U.S. Cl.
CPC ............ *H04N 19/124* (2014.11); *H04N 19/70* (2014.11); *H04N 19/96* (2014.11)

(56) References Cited

U.S. PATENT DOCUMENTS

| | | | |
|---|---|---|---|
| 2002/0135681 A1* | 9/2002 | Lo | H04N 5/144 |
| | | | 348/208.7 |
| 2011/0047155 A1* | 2/2011 | Sohn | H04N 19/134 |
| | | | 707/E17.014 |
| 2021/0099711 A1* | 4/2021 | Tourapis | H04N 19/147 |
| 2021/0142521 A1* | 5/2021 | Iguchi | H04N 19/70 |
| 2023/0290006 A1* | 9/2023 | Hur | H04N 19/513 |
| 2023/0316581 A1* | 10/2023 | Lee | H04N 19/56 |
| | | | 375/240.01 |
| 2023/0328270 A1* | 10/2023 | Lee | G06T 9/40 |
| | | | 375/240.16 |
| 2024/0205451 A1* | 6/2024 | Kidani | H04N 19/176 |
| 2024/0267525 A1* | 8/2024 | Zhao | H04N 19/137 |
| 2025/0022183 A1* | 1/2025 | Lasserre | G06T 7/251 |

FOREIGN PATENT DOCUMENTS

| | | | |
|---|---|---|---|
| KR | 20200092418 A | 8/2020 | |
| WO | WO-2018097078 A1 * | 5/2018 | ............ H04N 19/52 |
| WO | WO-2019087978 A1 * | 5/2019 | ........... H04N 19/176 |
| WO | 2020055869 A1 | 3/2020 | |
| WO | 2020138464 A1 | 7/2020 | |

OTHER PUBLICATIONS

Abe Kiyofumi translation of WO 2019087978 A1 Oct. 26, 2018 (Year: 2018).*

* cited by examiner

FIG. 6
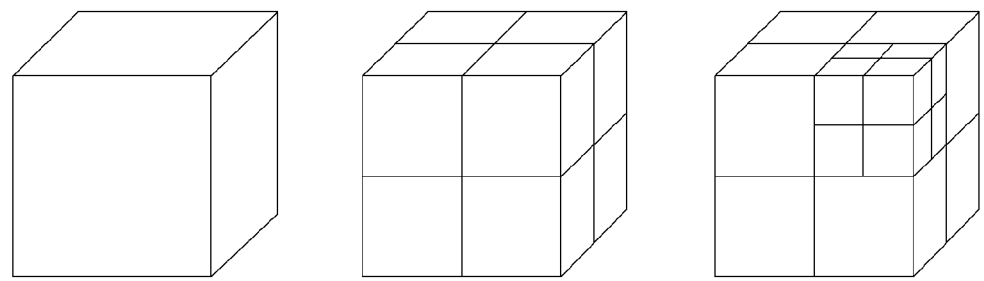
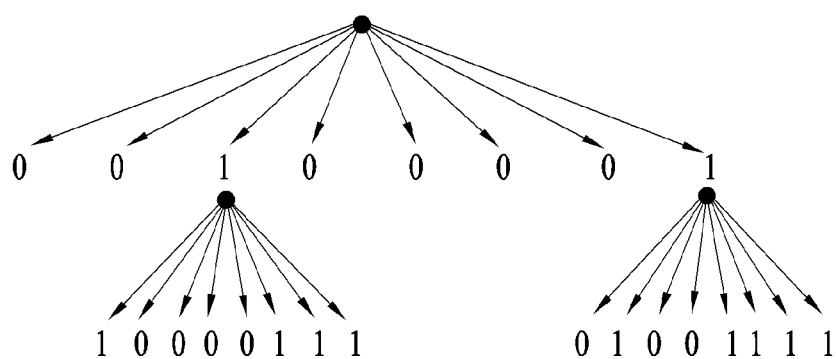

FIG. 7
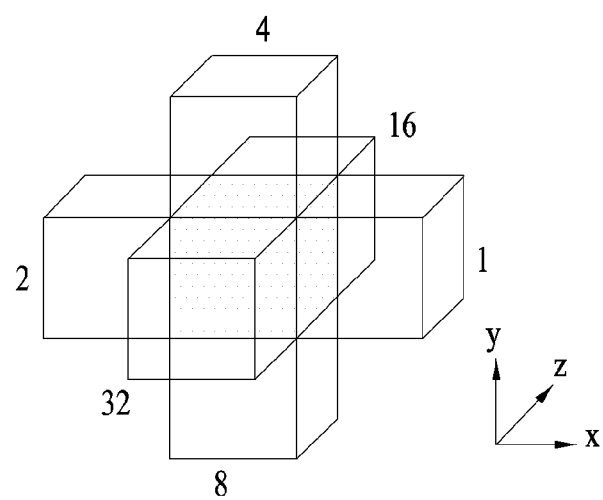
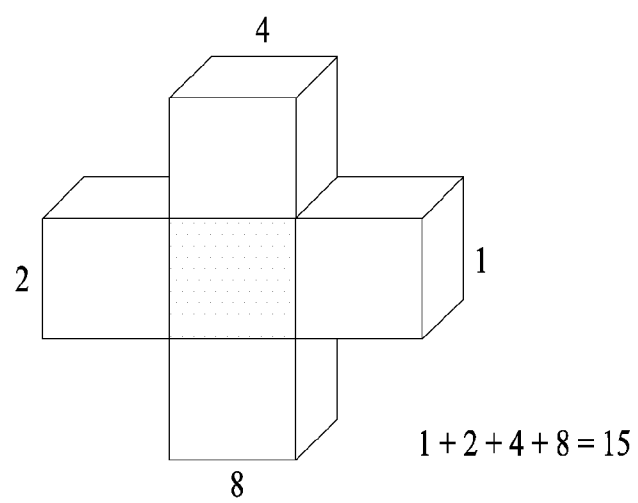
$1 + 2 + 4 + 8 = 15$

Vector form of the currently defined maximum size LUT
: 45° variation for every direction ○ PU coded prior to the current PU
● Current PU
○ PU or empty PU before coding

| seq_parameter_set_rbsp( ) { | Descriptor |
|---|---|
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| | |
|     else | |
|     { | |
|     searching_pattern | se(v) |
|     Amotion | ue(v) |
|     motion_precision | ue(v) |
|     } | |
| } | |
| .... | |
| } | |

FIG. 22

| tile_inventory( ) { | Descriptor |
|---|---|
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| | |
|     else | |
|     { | |
|     searching_pattern | se(v) |
|     Amotion | ue(v) |
|     motion_precision | ue(v) |
|     } | |
| } | |
| .... | |
| } | |

FIG. 23

| | Descriptor |
|---|---|
| geometry_parameter_set( ) { | |
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| | |
|     else | |
|     { | |
|     searching_pattern | se(v) |
|     Amotion | ue(v) |
|     motion_precision | ue(v) |
|     } | |
| } | |
| .... | |
| } | |

FIG. 24

| | Descriptor |
|---|---|
| attribute_parameter_set( ) { | |
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| | |
|     else | |
|     { | |
|     searching_pattern | se(v) |
|     Amotion | ue(v) |
|     motion_precision | ue(v) |
|     } | |
| } | |
| .... | |
| } | |

FIG. 25

| geometry_slice_header( ) { | Descriptor |
|---|---|
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| | |
|     else | |
|     { | |
|     searching_pattern | se(v) |
|     Amotion | ue(v) |
|     motion_precision | ue(v) |
|     } | |
| } | |
| .... | |
| } | |

FIG. 26

| NPI_parameter_set( ) { | Descriptor |
|---|---|
| .... | |
| num_PU | ue(v) |
| for(i=0; i<num_PU;i++) | |
| { PU_index [i] | ue(v) |
|     PU_coordinates[i] | se(v) |
|     PU_size[i] | ue(v) |
|     use_coded_neighbour_PU_flag[i] | u(1) |
|     if(use_coded_neighbour_PU_flag[i]) | |
|     { num_neighbour_PU | ue(v) |
|         threshold_neighbour_criteria | ue(v) |
|         for(j=0; j<num_neighbour_PU;j++) | |
|         { | |
|             Distance_to_current_PU[j] | ue(v) |
|             neighbour_PU_index[j] | ue(v) |
|             if (Distance_to_current_PU[j] < threshold_neighbour_criteria) | |
|             { | |
|                 motion_vector[j] | se(v) |
|                 attribute_neighbour_info[j] | se(v) |
|             } | |
|         } | |
|     } | |
| } | |
| .... | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is the National Stage filing under 35 U.S.C. 371 of International Application No. PCT/KR2021/011680, filed on Aug. 31, 2021, which claims the benefit of earlier filing date and right of priority to Korean Patent Application No. 10-2020-0115526, filed on Sep. 9, 2020, the contents of which are all incorporated by reference herein in their entireties.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 21 shows an example syntax of a sequence parameter set according to embodiments;

FIG. 22 shows an example syntax of a tile parameter set according to embodiments;

FIG. 23 shows an example syntax of a geometry parameter set according to embodiments;

FIG. 24 shows an example syntax of an attribute parameter set according to embodiments;

FIG. 25 shows an example syntax of a slice header of a geometry bitstream according to embodiments;

FIG. 26 shows an example syntax of an NPI parameter set according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
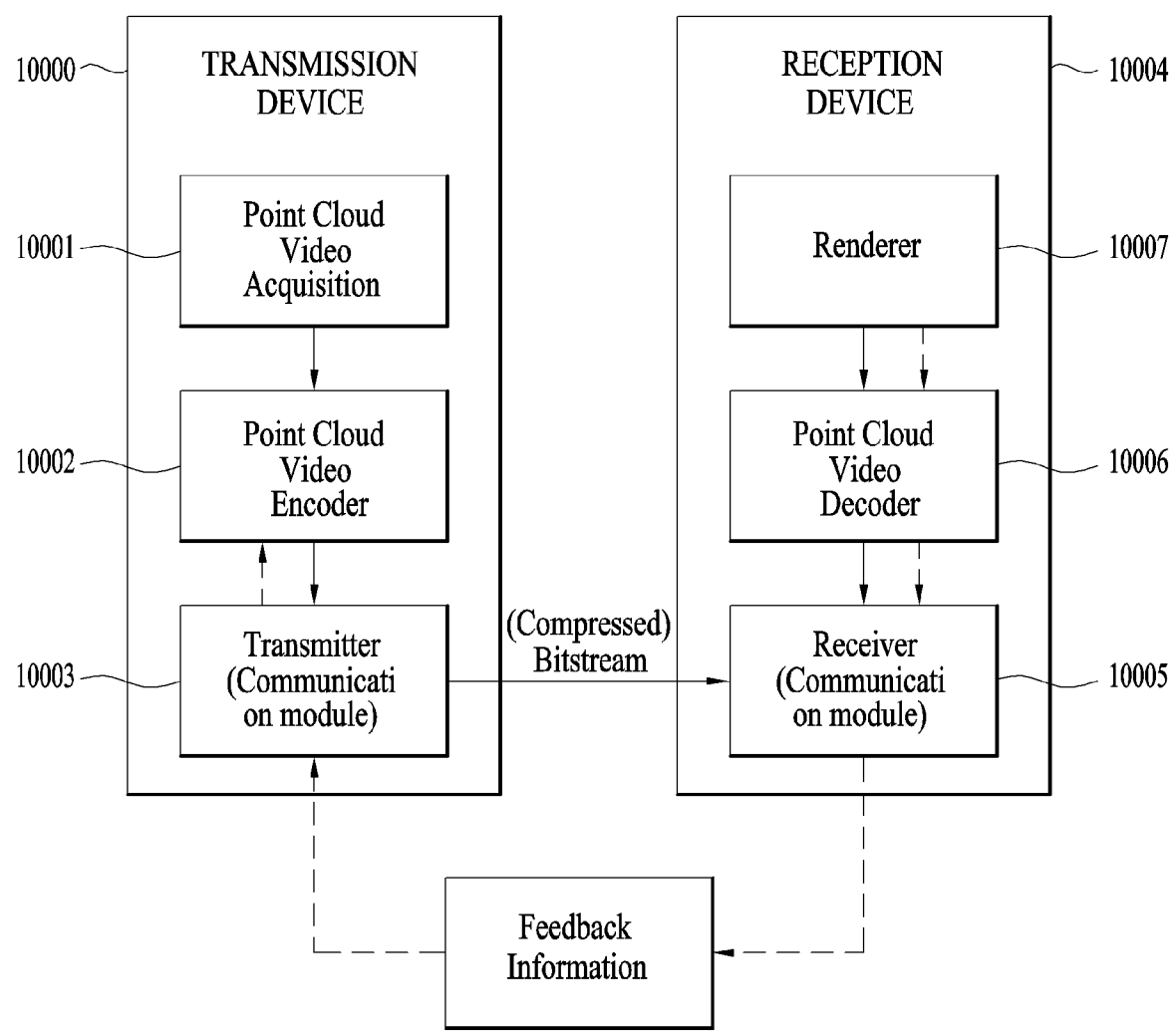
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data or point cloud data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
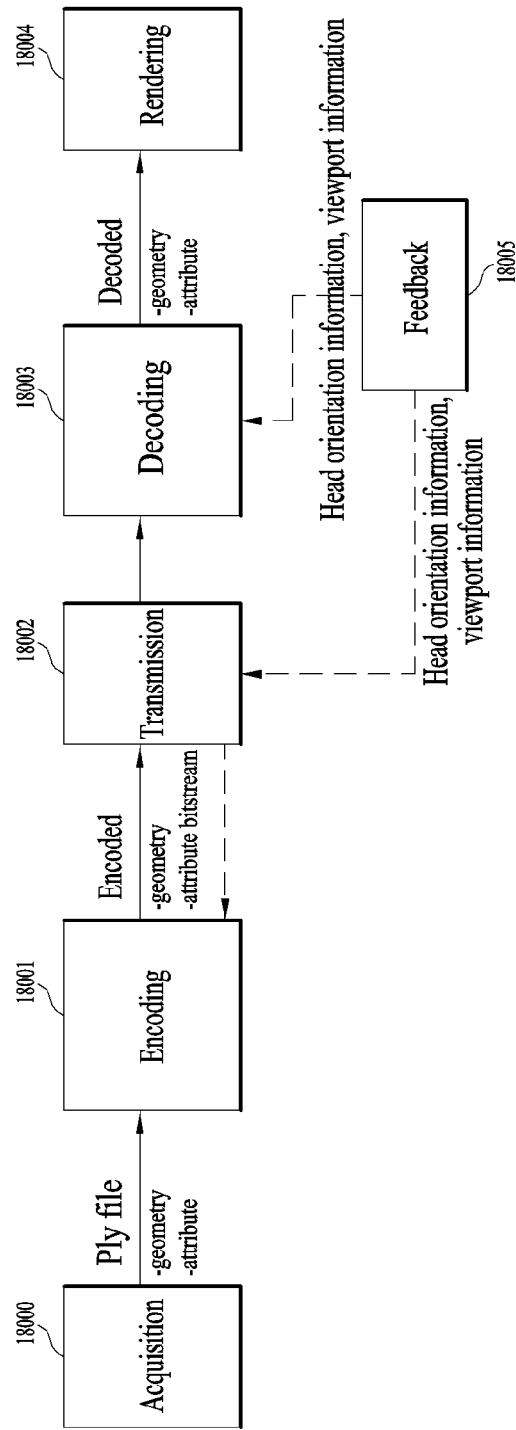
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
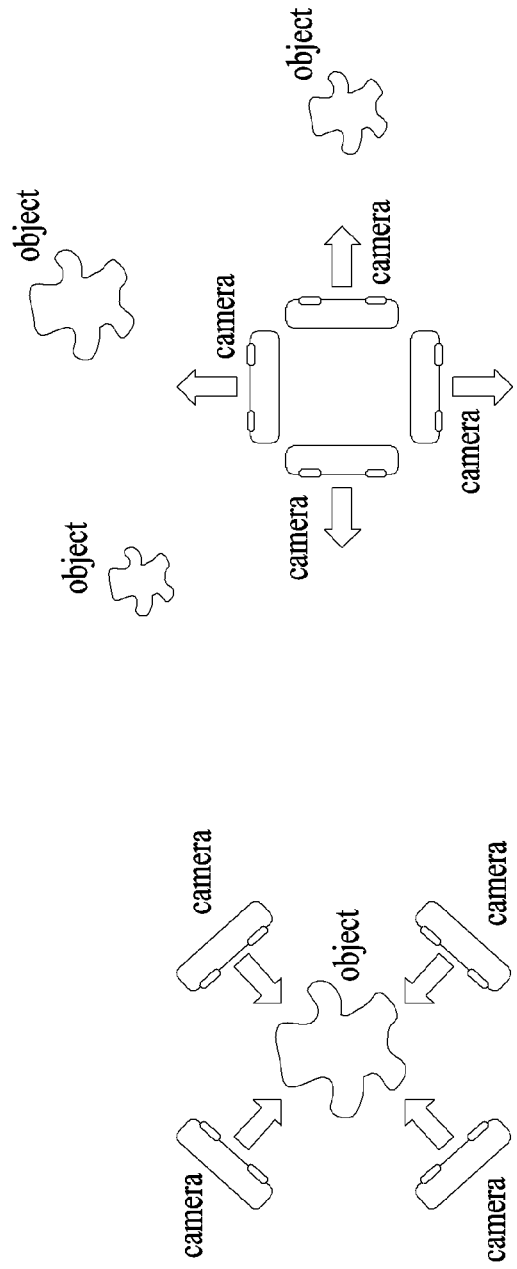
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
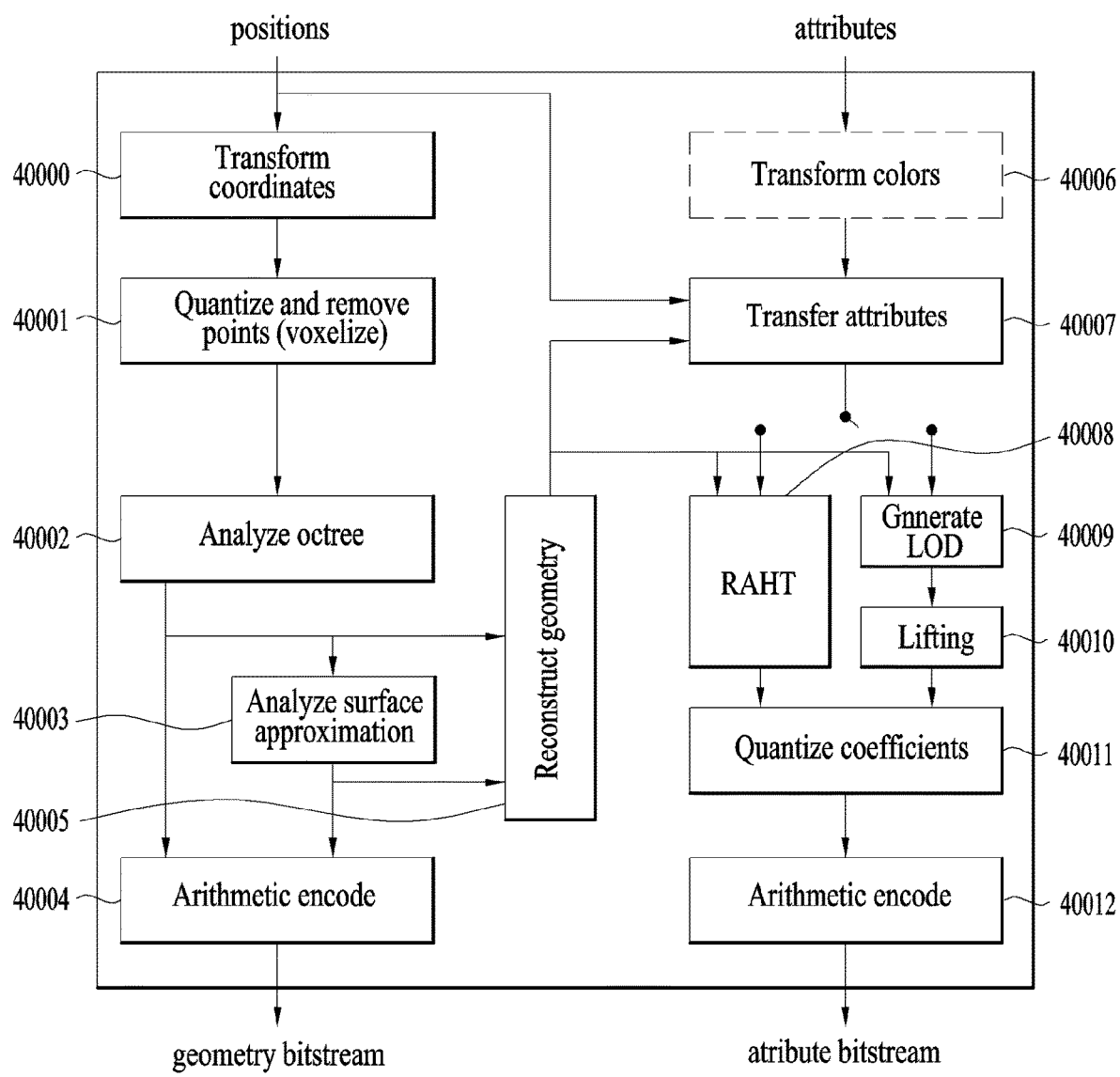
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, predictive tree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree, the predictive tree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
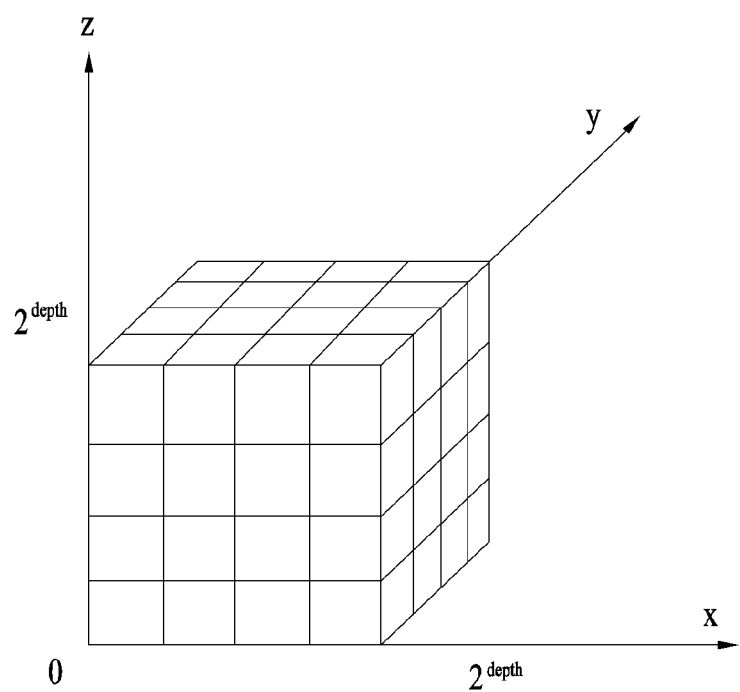
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d, 2^d, 2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log } 2(\text{Max}(x^{int}_n, y^{int}_n, z^{int}_n, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix}. \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Triangles formed from vertices ordered 1, . . . ,n
n triangles
3 (1,2,3)
4 (1,2,3), (3,4,1)
5 (1,2,3), (3,4,5), (5,1,3)
6 (1,2,3), (3,4,5), (5,6,1), (1,3,5)
7 (1,2,3), (3,4,5), (5,6,7), (7,1,3), (3,5,7)
8 (1,2,3), (3,4,5), (5,6,7), (7,8,1), (1,3,5), (5,7,1)
9 (1,2,3), (3,4,5), (5,6,7), (7,8,9), (9,1,3), (3,5,7), (7,9,3)
10 (1,2,3), (3,4,5), (5,6,7), (7,8,9), (9,10,1), (1,3,5), (5,7,9), (9,1,5)
11 (1,2,3), (3,4,5), (5,6,7), (7,8,9), (9,10,11), (11,1,3), (3,5,7), (7,9,11), (11,3,7)
12 (1,2,3), (3,4,5), (5,6,7), (7,8,9), (9,10,11), (11,12,1), (1,3,5), (5,7,9), (9,11,1), (1,5,9)

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
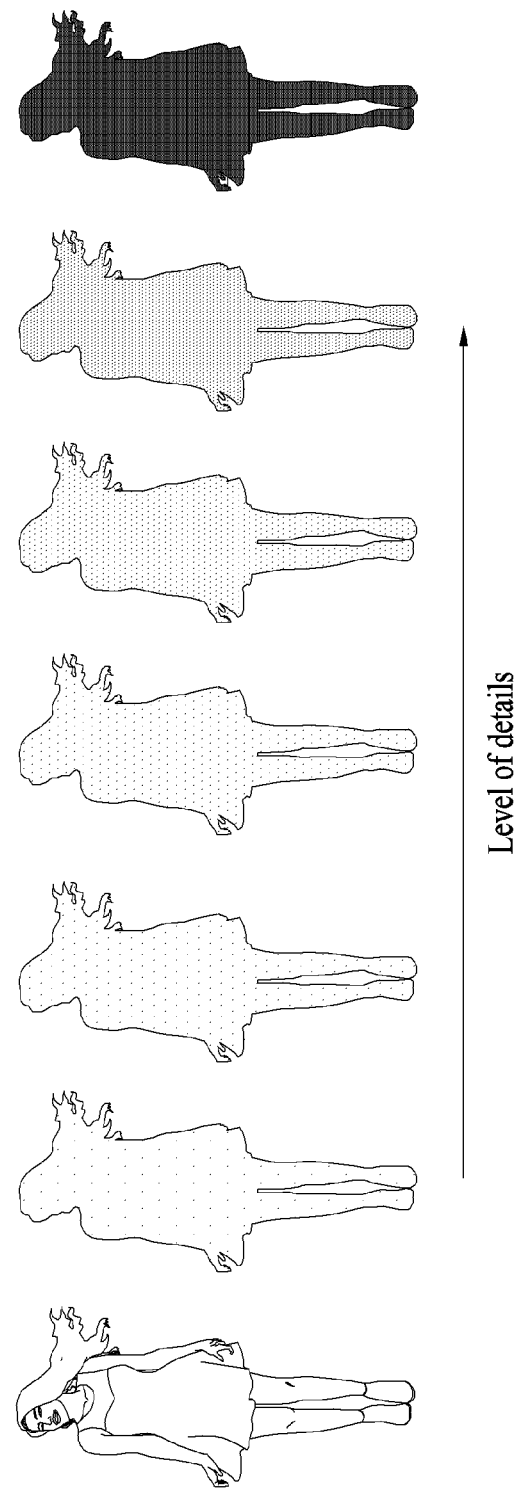
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
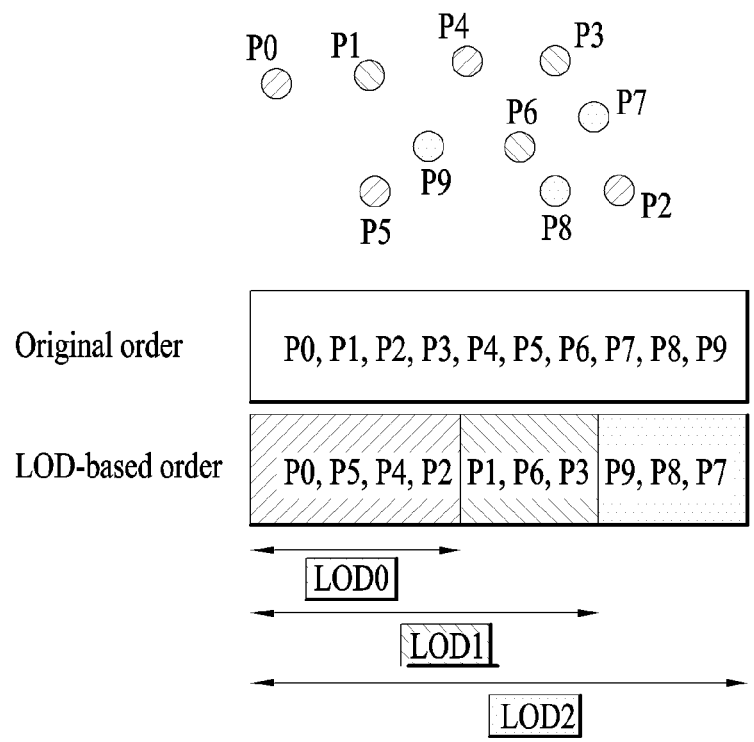
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, attribute residual values or attribute prediction residuals) obtained by subtracting a predicted attribute (attribute value) from the attribute (attribute value) of each point. The quantization process is configured as shown in the following table.

TABLE 1

Attribute prediction residuals quantization pseudo code

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 2

Attribute prediction residuals inverse quantization pseudo code

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h0_{0,0,0} \end{bmatrix} = T_{w1000\ w1001} \begin{bmatrix} g1_{0,0,0z} \\ g1_{0,0,1} \end{bmatrix}$$

The value of gDC is also quantized and subjected to entropy coding like the high-pass coefficients.

Figure 10:
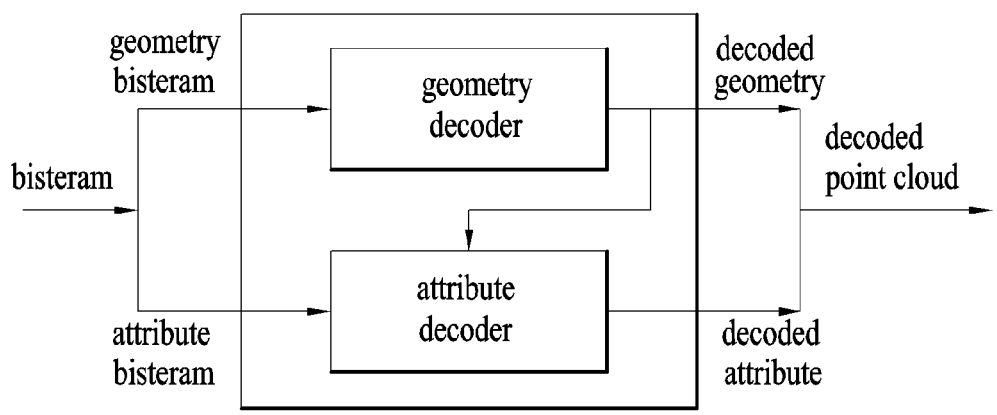
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
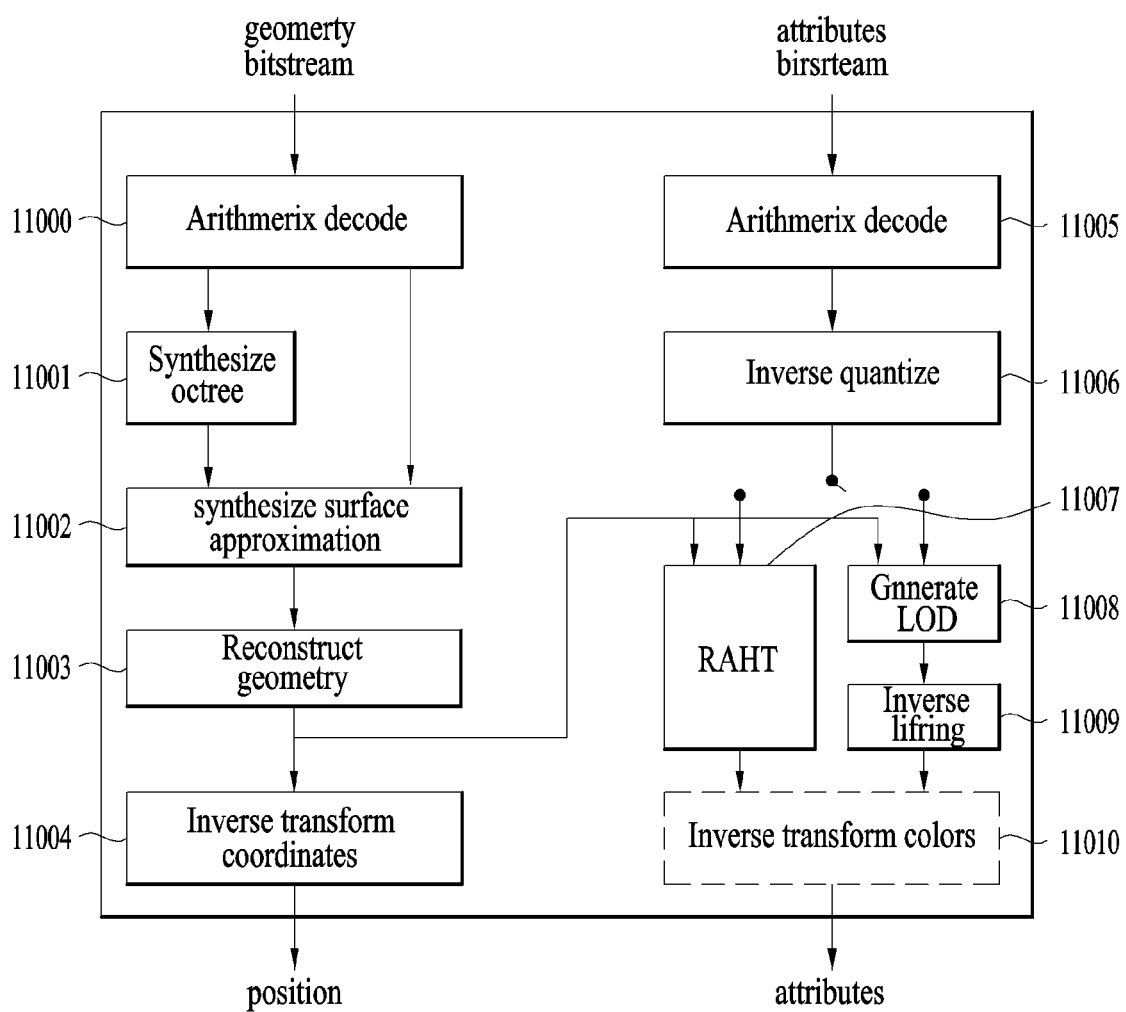
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
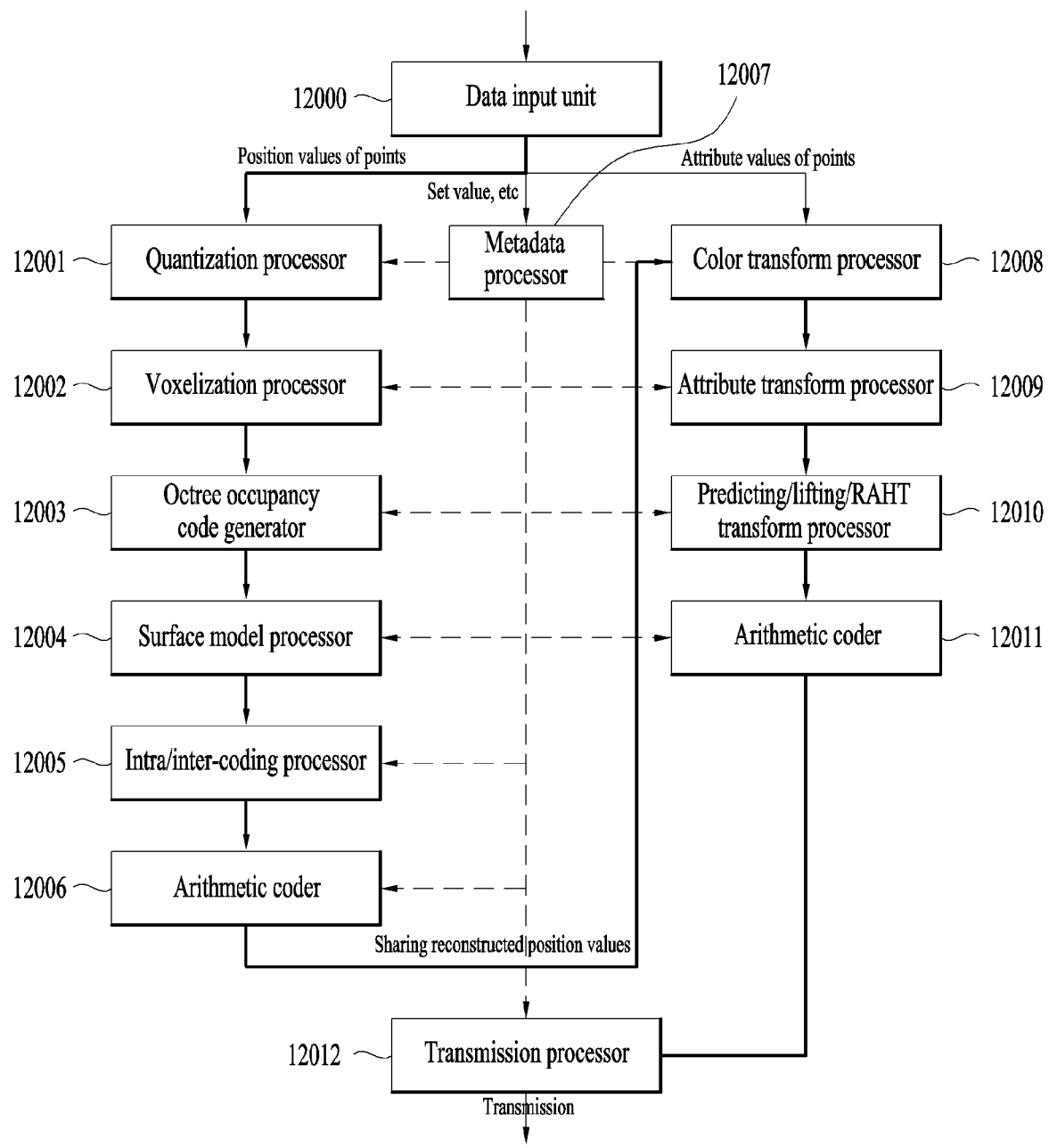
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
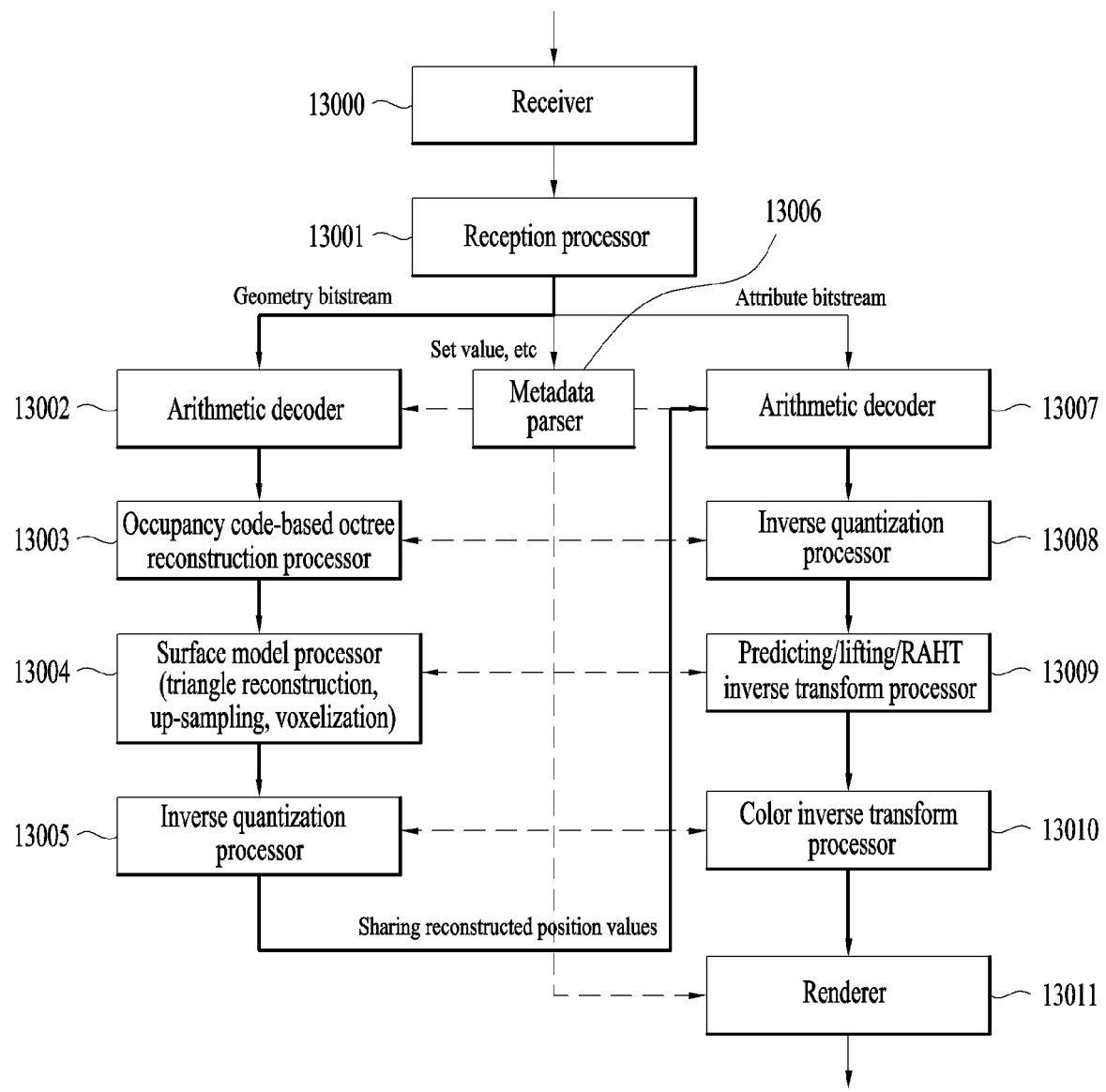
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform geometry 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
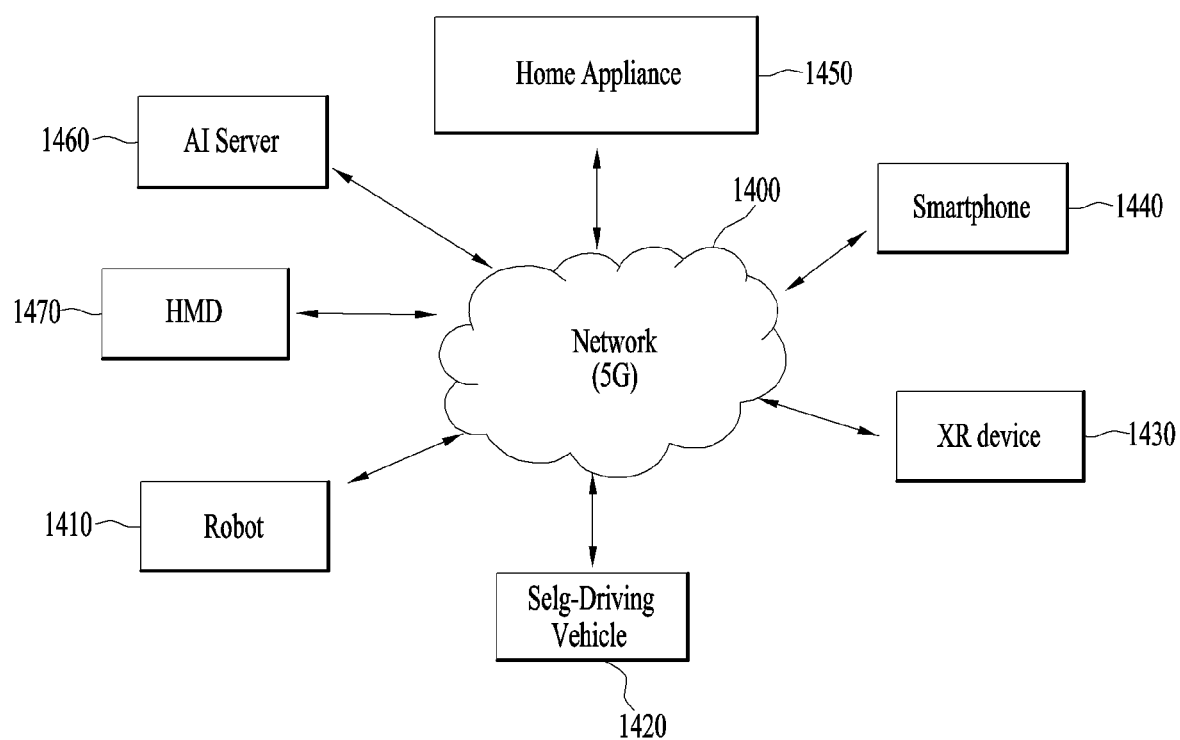
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, point cloud data is composed of a set of points, and each of the points may have geometry data (geometry information) and attribute data (attribute information). The geometry data is a three-dimensional position (e.g., coordinate values on x, y, and z axes) of each point. That is, the position of each point is represented by parameters of a coordinate system representing a three-dimensional space (e.g., parameters x, y, and z for three axes representing the space, such as the X-axis, Y-axis, and Z-axis). In addition, the attribute information may represent a color (RGB, YUV, etc.), reflectance, normal vectors transparency, and the like of a point. The attribute information may be expressed as a scalar or a vector.

According to embodiments, the point cloud data may be classified into category 1 of static point cloud data, category 2 of dynamic point cloud data, and category 3, which is acquired through dynamic movement, according to the type and acquisition method of the point cloud data. Category 1 is composed of a point cloud of a single frame with a high density of points for an object or space. The data of category 3 may be divided into frame-based data having multiple frames acquired through movement and fused data of a single frame obtained by matching a point cloud acquired through a LiDAR sensor and a color image acquired as a 2D image for a large space.

According to embodiments, in order to efficiently compress 3D point cloud data having multiple frames according to time, such as frame-based point cloud data having multiple frames, inter prediction coding/decoding may be used. Inter prediction coding/decoding may be applied to geometry information and/or attribute information. Inter prediction is inter-image prediction or inter-frame prediction, and intra prediction is intra-image prediction.

Hereinafter, a motion estimation method related to the inter prediction technique will be described.

Inter prediction predicts the entirety or a part of the current frame from the frame on which coding is performed, based on information with high similarity to the current frame. In this case, a unit in which the similarity is determined may be referred to as a prediction unit (PU). Inter prediction is a prediction technique using motions between a plurality of frames acquired over time. This technique is called motion vector estimation or motion estimation.

Motion estimation may be divided into global motion estimation, which is performed by rotating, shifting, enlarging, and/or reducing the entire frame, and local motion estimation, which is performed to predict the motion of a part of the frame.

In the motion estimation, the space of the current frame may be partitioned into PUs. Then, points included in a corresponding region may be extracted, and points included in the corresponding region in the corresponding reference frame may be extracted. Then, a distance difference and/or a vector difference between the extracted points of the current frame and the extracted points of the reference frame may be calculated. In this regard, a vector difference less than a specific value is set as a target vector difference.

For a unit vector set composed of multiple unit vectors pointing in different directions, each unit vector may be multiplied by an amount, which is any value. Thereby, a vector (unit vector×amount) most similar to the target vector difference may be searched for.

In this case, as the amount gradually decreases from an initial value to a preset minimum value, the above-described similar vector search operation may be repeated several times. A vector finally found by repeating the search operation may be set as the best vector, and a cost may be calculated using a technique of rate distortion optimization (RDO).

A PU may be divided into multiple sub-prediction units (sub-PUs), and the above-described best vector search operation may be performed in the divided sub-PUs. When the sum obtained by calculating the RDO cost of the divided sub-PUs is less than the RDO cost value of the PU, the PU is finally divided into sub-PUs. Otherwise, the best vector of the PU is signaled.

Figure 15:
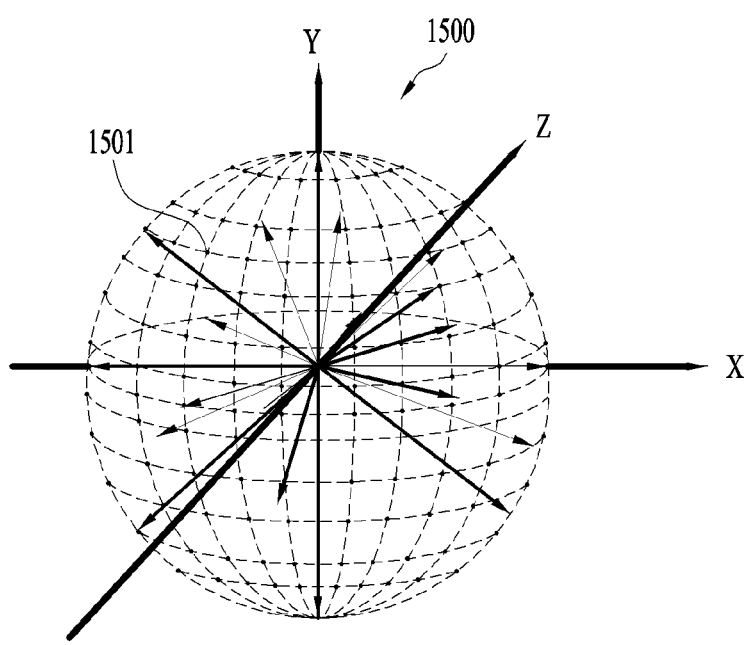
FIG. 15 illustrates an example of unit vectors included in a search pattern used to search for motion vectors in motion estimation according to embodiments.

FIG. 15 illustrates an example of a set of unit vectors included in a search pattern used to search for motion vectors in motion estimation according to embodiments. The unit vector set 1500 may be composed of multiple unit vectors pointing in different directions, and the directions of the unit vectors may differ from those of neighboring unit vectors by 45 degrees or 90 degrees. FIG. 15 shows a set of 26 unit vectors which differ in direction from neighboring unit vectors by 45 degrees. The number and directions of unit vectors constituting the unit vector set may be appropriately changed and applied.

Figure 15A:
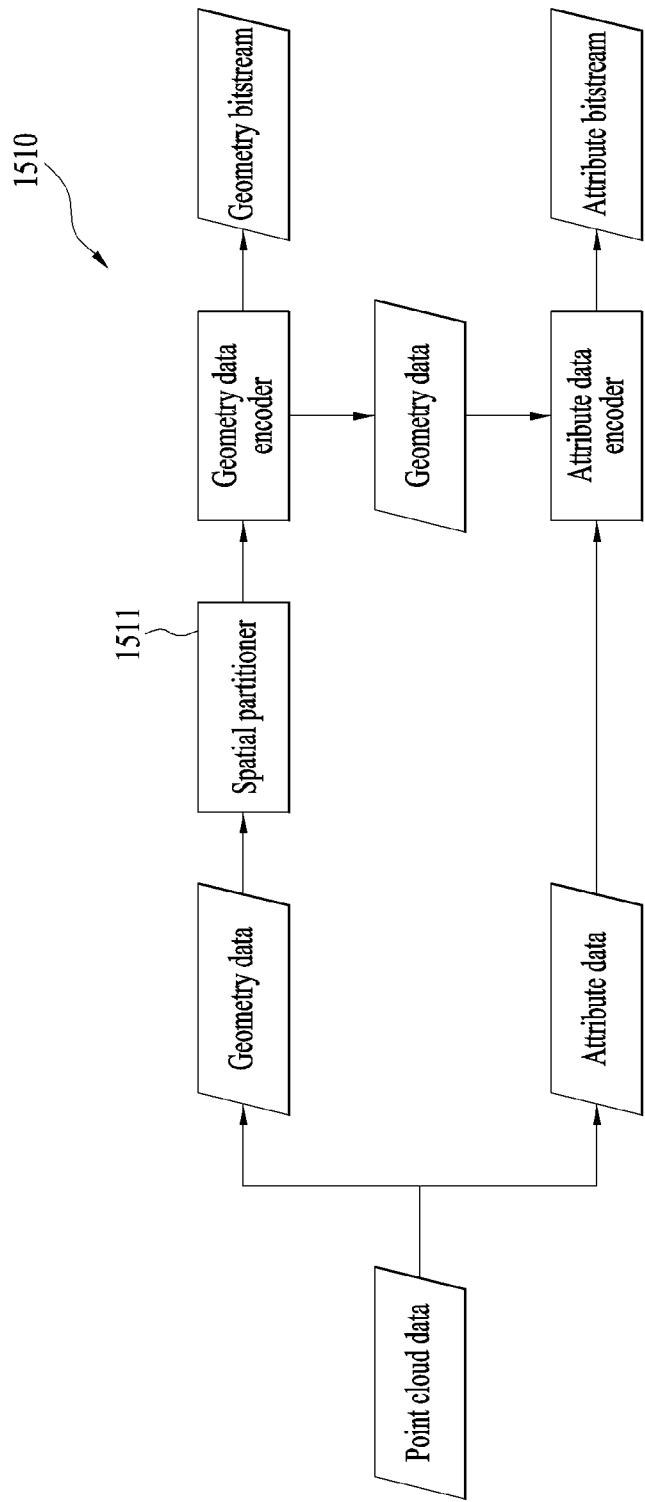
FIG. 15A illustrates an example of a point cloud data transmission device according to embodiments.

FIG. 15A illustrates an example of a point cloud data transmission device according to embodiments.

A point cloud transmission device 1510 according to the embodiments may include a spatial practitioner 1511, a geometry data encoder, and an attribute data encoder. Although not shown in FIG. 15A, the transmission device 1510 may be connected to or may include the same components as the data input unit 12000 (in FIG. 12), the coordinate transformer 40000 (in FIG. 4), the quantization/voxelization unit 40001 (in FIG. 4), the transmission processor 12012 (in FIG. 12), and the metadata processor 12007 (FIG. 12).

Point cloud data input to the data input unit 12000 may include geometry data and/or attribute data about each point. Geometry data may be a coordinate vector of (x, y) in a 2-dimensional Cartesian coordinate system, (γ, θ) in a cylindrical coordinate system, (x, y, z) in a Cartesian coordinate system in a 3-dimensional space, (γ, θ, z) in a cylindrical coordinate system, or (γ, θ, φ) in a spherical coordinate system. The attribute data may be a vector (R, G, B) representing the color of a point and/or a vector of values acquired from one or more sensors, such as a brightness value, and/or a reflection coefficient of LiDAR, and/or a temperature value acquired from a thermal imaging camera.

The spatial partitioner 1511 may spatially partition the input point cloud data into one or more 3D blocks based on a bounding box and/or a sub-bounding box. Here, the 3D block may represent a tile group, a tile, a slice, a coding unit (CU), a prediction unit (PU), or a transformation unit (TU).

Spatial partitioning may be performed based on at least one of an octree, a quadtree, a binary tree, a triple tree, or a k-d tree. Alternatively, the data may be partitioned into blocks of a predetermined width, height, and depth. Alternatively, the partitioning may be performed by selectively determining various positions and sizes of blocks. That is, input point cloud data may be partitioned into voxel groups such as slices, tiles, bricks, or subframes. In addition, the input point cloud data may be equally or unequally partitioned by one or more axes in a Cartesian coordinate system (x, y, z), a cylindrical coordinate system (γ, θ, z), or a spherical coordinate system (γ, θ, φ). In addition, signaling information for the partitioning may be entropy-encoded in the metadata processor 12007 and then transmitted in the form of a bitstream via the transmission processor 12012.

The point cloud content may be one person or several people, one object or several objects, but may also be a map for autonomous driving on a larger scale or a map for indoor navigation of a robot. When the point cloud content is a large amount of locally connected data, it may not be encoded/decoded at once. Accordingly, tile partitioning may be performed before compressing the point cloud content.

For example, in a building, room #101 may be partitioned into one tile and room #102 may be partitioned into another tile. In order to support fast encoding/decoding by applying parallelization to the partitioned tiles, the tiles may be partitioned into slices again. This operation is referred to as slice partitioning (or splitting).

A tile may represent a partial region (e.g., a rectangular cuboid) of a 3D space occupied by point cloud data according to embodiments. According to embodiments, a tile may include one or more slices. The tile may be partitioned into one or more slices, and thus the point cloud video encoder may encode point cloud data in parallel.

A slice may represent a unit of data (or bitstream) that may be independently encoded by the point cloud video encoder according to the embodiments and/or a unit of data (or bitstream) that may be independently decoded by the point cloud video decoder. A slice may be a set of data in a 3D space occupied by point cloud data, or a set of some data among the point cloud data. A slice may represent a region or set of points included in a tile according to the embodiments. According to embodiments, a tile may be partitioned into one or more slices based on the number of points included in the tile. For example, a tile may be a set of points partitioned by the number of points. According to embodiments, a tile may be partitioned into one or more slices based on the number of points, and some data may be split or merged in the partitioning process. That is, a slice may be a unit that may be independently coded within a corresponding tile. A tile obtained by spatial partitioning as described above may be partitioned into one or more slices for fast and efficient processing.

The point cloud video encoder according to the embodiments may encode point cloud data on a slice-by-slice basis or a tile-by-tile basis, wherein a tile may include one or more slices. In addition, the point cloud video encoder may perform different quantization and/or transformation on each tile or each slice.

Positions of one or more 3D blocks (e.g., slices) spatially partitioned by the spatial partitioner 1511 are output to the geometry data encoder, and attribute information is output to the attribute data encoder. The positions may be position information (geometry information) about points included in a partitioned unit (a box, block, coding unit, prediction unit, transformation unit, tile, tile group, or slice), and is referred to as geometry information.

The geometry data encoder may perform some or all of the operations of the point cloud video encoder 10002 of FIG. 1, the encoding 20001 of FIG. 2, the point cloud video encoder of FIG. 4, and the point cloud video encoder of FIG. 12.

The geometry data encoder compresses the positions (i.e., geometry information) output from the spatial partitioner 1511 by intra-prediction or inter-prediction, performs entropy coding, and outputs a geometry bitstream. According to embodiments, the encoding by the geometry data encoder may be performed on the entire point cloud or in sub-point cloud units, prediction units (PUs) or coding units (CUs), and inter-prediction (inter-frame prediction) or intra-prediction (i.e., intra-frame prediction) may be selected for each PU.

The geometry bitstream generated by the geometry data encoder may be transmitted to the reception device. Also, geometry data compressed by applying the inter-prediction or intra-prediction is reconstructed for attribute compression. The reconstructed geometry information (or referred to as restored geometry information) is output to the attribute data encoder.

The attribute data encoder compresses the attribute information output from the spatial partitioner 1511 by applying intra-prediction or inter-prediction based on the reconstructed geometry information, and performs entropy coding to output an attribute bitstream. The attribute bitstream generated by the attribute data encoder may be transmitted to the reception device.

The transmission processor 12012 may transmit the geometry bitstream output from the geometry data encoder, the attribute bitstream output from the attribute data encoder, and a signaling bitstream output from the metadata processor 12007, respectively, or may transmit one bitstream into which the bitstreams are multiplexed. In addition, it may encapsulate the bitstream into a file or segment (e.g., a streaming segment) and then transmit the encapsulated bitstream over various networks such as a broadcasting network and/or a broadband network.

The metadata processor 12007 may generate and/or process signaling information and output the same to the transmission processor in the form of a bitstream. The signaling information generated and/or processed by the metadata processor 12007 may be provided to the geometry data encoder, the attribute data encoder, and/or the transmission encoder for geometry encoding and attribute encoding and transmission, and the metadata processor 12007 may receive signaling information generated by the geometry data encoder, the attribute data encoder, and/or the transmission processor.

In the present disclosure, the signaling information may be signaled and transmitted on a per parameter set (sequence parameter set (SPS), geometry parameter set (GPS), attribute parameter set (APS), tile parameter set (TPS), or the like) basis. Alternatively, it may be signaled and transmitted per CU of each image, such as slice or tile.

In the present disclosure, the signaling information may include metadata (e.g., set values) related to point cloud data, and may be provided to the geometry data encoder, the attribute data encoder, and/or the transmission processor for geometry encoding, attribute encoding, and transmission. Depending on the application, the signaling information may also be defined at the system side, such as a file format, dynamic adaptive streaming over HTTP (DASH), or MPEG media transport (MMT), or at the wired interface side, such as high definition multimedia interface (HDMI), Display Port, Video Electronics Standards Association (VESA), or CTA.

Although not shown in the figure, elements of the point cloud transmission device of FIG. 15A may be implemented as hardware including one or more processors or integrated circuits configured to communicate with one or more memories, software, firmware, or combinations thereof. The one or more processors may perform at least one of the operations and/or functions of the elements of the point cloud transmission device of FIG. 15A described above. Additionally, the one or more processors may operate or execute a set of software programs and/or instructions for execution of the operations and/or functions of the elements of the point cloud transmission device of FIG. 15A. The one or more memories may include a high speed random access memory, or include a non-volatile memory (e.g., one or more magnetic disk storage devices, flash memory devices, or other non-volatile solid-state memory devices).

In addition, the geometry data encoder and/or the attribute data encoder of FIG. 15A may include one or more processors and one or more memories electrically or communicatively coupled with the one or more processors for compression of geometry information and attribute information. In addition, the one or more processors may be configured as one or more physically separated hardware processors, a combination of software/hardware, or a single hardware processor. The one or more processors may be electrically and communicatively coupled with each other. Also, the one or more memories may be configured as one or more physically separated memories. The one or more memories may store one or more programs for processing the point cloud data.

As described above, inter-prediction requires information about a reference frame or a prediction unit to be referenced. The reference frame may be a frame referenced (or involved) to encode/decode the current frame. The reference frame may be a previous frame of the current frame, a frame next to the current frame, or a plurality of previous frames.

Figure 15B:
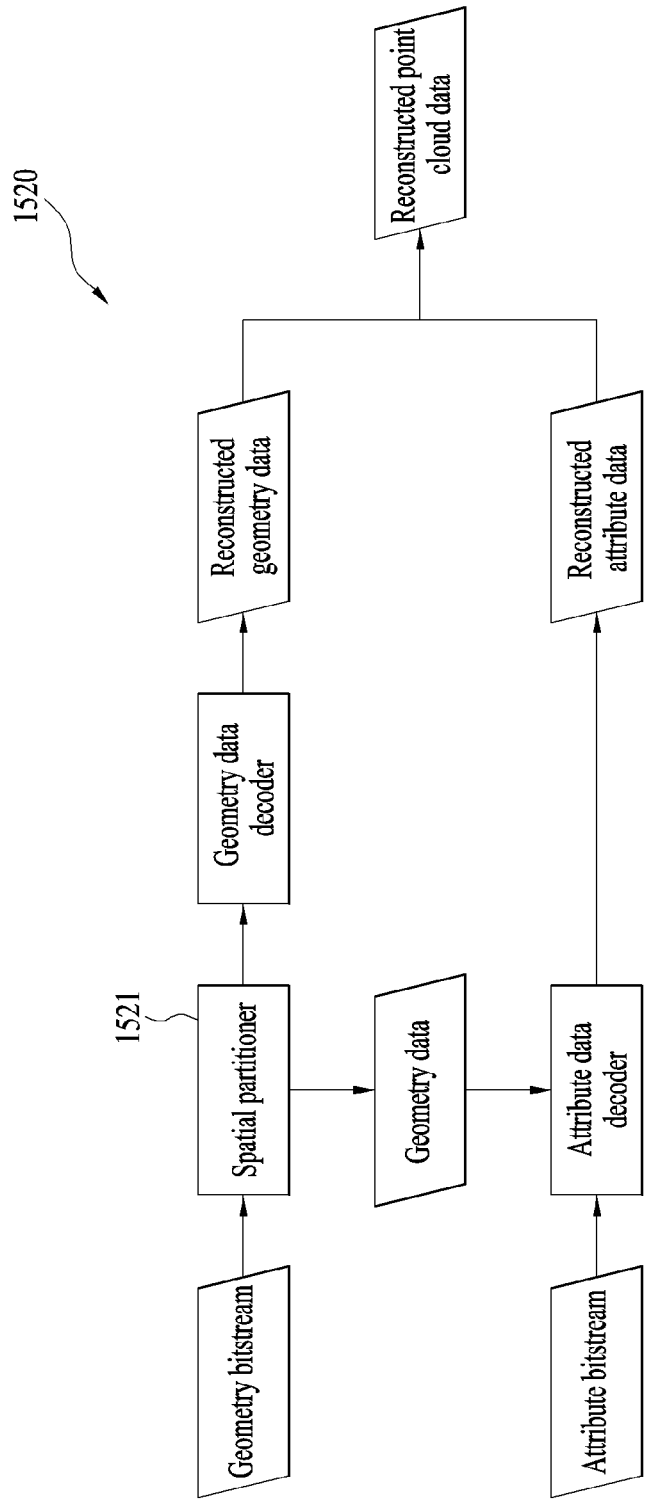
FIG. 15B illustrates an example of a point cloud data reception device according to embodiments.

FIG. 15B illustrates an example of a point cloud data reception device according to embodiments. The reception device 1520 receives a geometry bitstream and an attribute bitstream, and the geometry data decoder and the attribute data decoder reconstruct the geometry data and the attribute data, respectively.

The point cloud data reception device 1520 may include a spatial partitioner 1521, a geometry data decoder, and an attribute data decoder. Although not shown in FIG. 15B, the reception device 1520 may be connected to or further include the same or similar components as the reception processing processor 13001 (in FIG. 13), the renderer 1311 (in FIG. 13), and the metadata parser 13006 (in FIG. 13) according to the embodiments. The elements of the point cloud data reception device 1520 shown in FIG. 15B may be implemented as hardware, software, a processor, and/or a combination thereof.

According to embodiments, the geometry data decoder and the attribute data decoder may be referred to as a point cloud video decoder. According to embodiments, the point cloud video decoder may be referred to as a PCC decoder, a PCC decoding unit, a point cloud decoder, a point cloud decoding unit, or the like.

According to embodiments, the point cloud video decoder may perform the reverse processes of the operations of the geometry data encoder and attribute data encoder of the transmission device based on signaling information for a compressed geometry bitstream and attribute bitstream to reconstruct geometry information and attribute information. The point cloud video decoder may perform some or all of the operations described in relation to the point cloud video decoder of FIG. 1, the decoding of FIG. 2, the point cloud video decoder of FIG. 11, and the point cloud video decoder of FIG. 13.

When the received point cloud data is configured in units of tiles and/or slices, the spatial partitioner 1521 may perform a reverse process of spatial partitioning in the transmission device based on signaling information. For example, when a bounding box is partitioned into tiles and slices, the bounding box may be reconstructed by combining the tiles and/or slices based on the signaling information. In another embodiment, the spatial partitioner 1521 may partition the space of the received point cloud data. For example, the received point cloud data may be partitioned according to parsed partition information such as a sub-point cloud, and/or an encoding/decoding unit (CU), a prediction unit (PU), or a transformation unit (TU) determined by the point cloud video encoder of the transmission device. The CU, the PU, and the TU may have the same partition structure or different partition structures according to embodiments.

The reception processor 13001 according to the embodiments may receive one bitstream, or may receive a geometry bitstream, an attribute bitstream, and a signaling bitstream, respectively. When a file and/or segment is received, the reception processor 13001 (in FIG. 13) may decapsulate the received file and/or segment and output a bitstream for the same.

When one bitstream is received (or decapsulated), the reception processor 13001 may demultiplex a geometry bitstream, an attribute bitstream, and a signaling bitstream from the bitstream, and deliver the demultiplexed signaling bitstream to the metadata parser 13006, the demultiplexed geometry bitstream to the geometry data decoder, and the demultiplexed attribute bitstream to the attribute data decoder.

The metadata parser 13006 may parse and process information included in the signaling information, for example, information included in the SPS, GPS, APS, TPS, or metadata, from the input signaling bitstream, and provide the same to the geometry data decoder and the attribute data decoder. In another embodiment, the signaling information included in the geometry slice header and/or the attribute slice header may be parsed by the metadata parser 13006 before decoding of the corresponding slice data.

The geometry-related prediction information, which is used for inter-prediction and/or intra-prediction of geometry information, and the attribute-related prediction information, which is used for inter-prediction and/or intra-prediction of the attribute information, may be collectively referred to as information related to point cloud data prediction.

The geometry data decoder may reconstruct the compressed geometry information by performing a reverse process of the operations of the geometry data encoder of FIG. 15A for the geometry bitstream based on the signaling information (e.g., geometry-related parameters including geometry-related prediction information, or information related to point cloud data prediction). According to embodiments, the geometry data decoder may perform geometry data decoding per sub-point cloud or encoding/decoding unit (CU), and may reconstruct geometry information by performing intra-frame prediction (i.e., intra-prediction) or inter-frame prediction (i.e., inter-prediction) for each encoding/decoding unit (CU) based on information (e.g., a flag) indicating whether the prediction is intra-prediction or inter-prediction.

The geometry data restored (or reconstructed) by the geometry data decoder is delivered to the attribute data decoder.

The attribute data decoder may reconstruct the attribute information by performing the reverse process of the operations of the attribute data encoder of FIG. 15A for the compressed attribute bitstream based on the signaling information (e.g., attribute-related parameters including attribute-related prediction information, or information related to point cloud data prediction) and the reconstructed geometry information. According to embodiments, the attribute data decoder may reconstruct the attribute information based on the signaling information during inter-prediction or intra-prediction. The attribute data decoder may perform attribute decoding on the entire point cloud or per sub-point cloud or encoding/decoding unit (CU), and reconstruct the attribute information by performing intra-frame prediction (i.e., intra-prediction) or inter-frame prediction (i.e., inter-prediction) for each encoding/decoding unit (CU) based on information (e.g., a flag) indicating whether the prediction is intra-prediction or inter-prediction.

According to embodiments, in the case where the point cloud data is partitioned into tiles and/or slices at the transmission device side, the geometry data decoder and the attribute data decoder may perform geometry decoding and attribute decoding on a tile-by-tile basis and/or a slice-by-slice basis.

According to embodiments, the geometry data decoder and the attribute data decoder of FIG. 15B may perform some or all of the operations of the point cloud video decoder of FIG. 1, 2, 11, or 13.

The geometry data decoder and attribute data decoder of FIG. 15B may include one or more processors and one or more memories electrically or communicatively coupled with the one or more processors for reconstruction of the point cloud data. In addition, the one or more processors may be configured as one or more physically separated hardware processors, a combination of software/hardware, or a single hardware processor. The one or more processors may be electrically and communicatively coupled with each other. Also, the one or more memories may be configured as one or more physically separated memories. The one or more memories may store one or more programs for processing the point cloud data.

Elements of the point geometry data decoder and the attribute data decoder shown in FIG. 15B may be implemented as hardware, software, processors, and/or combinations thereof.

In the inter-prediction method described above, the operation of calculating distances from points included in the reference frame and the operation of searching for the best vector by multiplying the unit vector by an amount are repeatedly performed for all PUs. Accordingly, the efficiency of motion estimation may be degraded.

The present disclosure relates to inter-prediction coding/decoding for increasing the compression efficiency and processing speed for point cloud data having one or more frames. In this regard, proposed herein is a method for efficiently searching for motion vectors of the current prediction unit, current coding unit, current transform unit, current brick, current tile, and/or current slice by referring to the motion vectors of a neighbor prediction unit, a neighbor coding unit (CU), a neighboring transform unit (TU), a neighbor brick, a neighbor tile, and/or a neighbor slice.

In addition, the present disclosure provides a device and method for processing point cloud data, by which a motion vector of a current unit may be generated by applying a distance-based weight to a motion vector of a neighbor unit. In addition, the motion vector of the current unit may be generated by reflecting other information for determining the similarity between units in addition to the distance.

Figure 16:
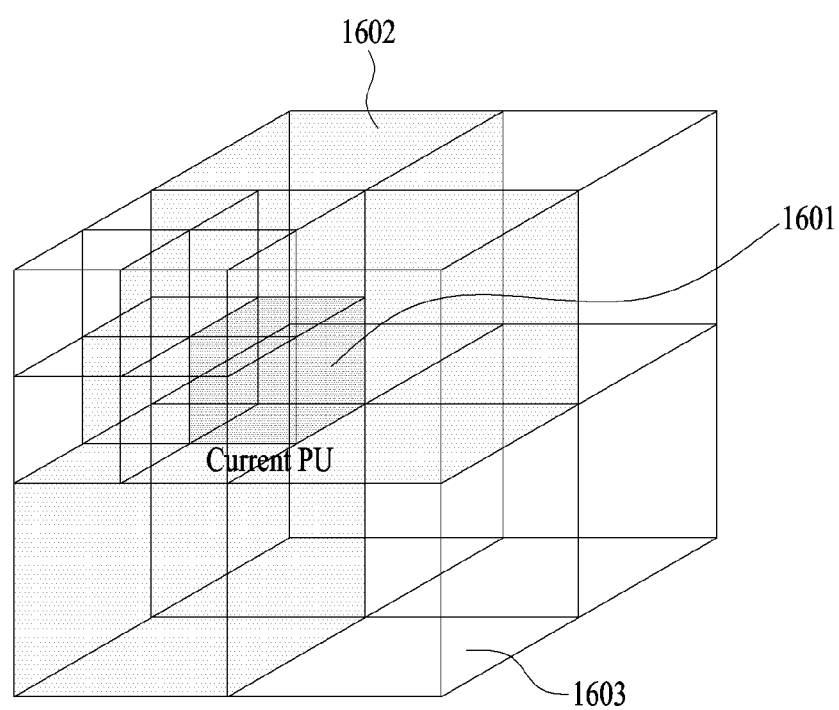
FIG. 16 illustrates an example of prediction units generated through a spatial partition process according to embodiments.

FIG. 16 illustrates an example of PUs generated through a spatial partition process according to embodiments. Referring to FIG. 16, a current PU 1601 and neighbor PUs 1602 coded prior to the current PU 1601 are shown. When motion vectors of the neighbor PUs 1602 coded prior to the current PU 1601 have been determined, the motion vector of the current PU 1601 may be determined based on the information about the neighbor PUs 1602.

Figure 17:
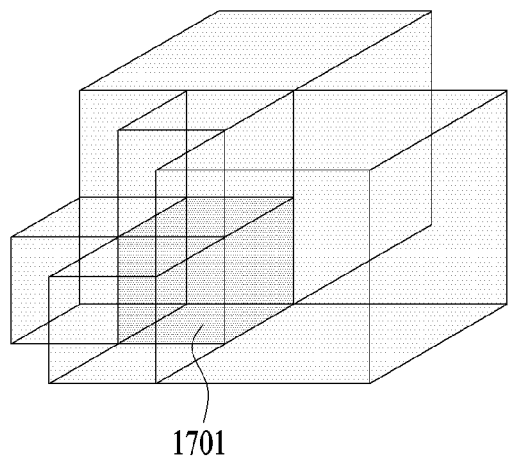
FIG. 17 illustrates an example of a current prediction unit and neighbor prediction units according to embodiments.

FIG. 17 shows neighbor PUs that share a face with a current PU 1701. A criterion for determining neighbor PUs may be appropriately changed by a user. The criterion for determining the neighbor PU 1602 may be defined as an adjacent PU that shares a vertex, edge, or face with the current PU 1601.

Figure 18:
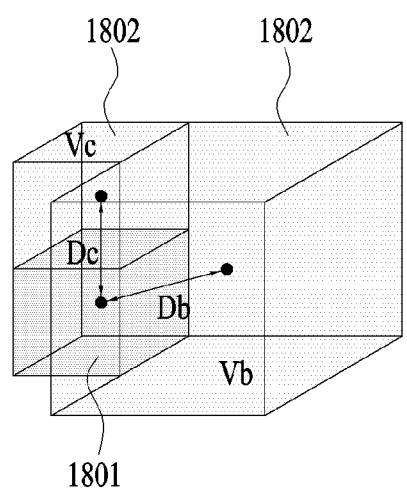
FIG. 18 illustrates a distance between a current prediction unit and a neighbor prediction unit according to embodiments.

FIG. 18 illustrates a method of generating a motion vector of a current PU 1801 by applying a weight based on distances between the current PU 1801 and neighbor PUs 1802.

The distances between the current PU 1801 and the neighbor PUs 1802 may be calculated as distances Db and Dc between the center of the current PU 1801 and the center of the neighbor PUs 1802 as shown in FIG. 18. However, the reference point for calculating the distances between the units may be not only the centers of the units, but also vertices or centers of gravity of the units. The distances between the units may be calculated based on any set reference.

In FIG. 18, the motion vector Va of the current PU 1801 is calculated based on the distances Db and Dc between the neighbor PUs 1802 and the current PU 1801 and the motion vectors Vb and Vc of the neighbor PUs 1802 in the equation given below.

$$V_a = \left(1 - \frac{D_c}{D_c + D_b}\right)V_c + \left(1 - \frac{D_b}{D_c + D_b}\right)V_b$$

There may be cases where the number of neighbor PUs is large. Accordingly, the equation is generalized for N neighbor PUs as shown below. That is, the motion vector Va of the current PU may be calculated as the total sum of values obtained by applying distance weights to the motion vectors of previously coded neighbor PUs.

$$V_a = \sum_{i=1}^{N}\left(1 - \frac{D_i}{\sum_{j=1}^{N} D_j}\right)V_i$$

When neighbors are limited to neighbor units sharing a face with the current PU, the maximum number of neighbor PUs is 6 and N is 6. When the neighbors include units sharing a vertex or edge, the maximum number of neighbor PUs may be 26. However, utilization of the neighbor PUs may be limited to some neighbor PUs. For example, only any number of nearest neighbor PUs among the N neighbor PUs may be used for motion vector calculation.

When distance-based weights are reflected, distances between points may be calculated based on position information about the points included in the neighbor PU and position information about the points included in the current PU, and used as weights. For example, for each of the points included in the current PU, the points included in the neighbor PU may be placed in one pool, and the distances may be calculated. Then, any number of nearest points may be selected and used as a weight value for predicting the motion vector of each point included in the current PU.

Also, when the distance-based weight is not considered, the motion vector of the current PU may be generated as an arithmetic average of motion vectors of neighbor PUs.

In addition, when motion vector estimation is performed on attribute data, distance information and attribute information may be utilized simultaneously to generate a current PU or motion vectors of points included in the current PU. The equation for calculating the motion vector of the current PU based on the attribute information is given below.

$$V_c = \sum_{i=1}^{N}\left(1 - \frac{D_i A_i}{\sum_{j=1}^{N} D_j A_j}\right)V_i$$

Here, Ai is the difference between the attribute information about a neighbor PU and the attribute information about the current PU. In this case, the attribute information may be a representative attribute value of points positioned in the unit. Di denotes the distance between the neighbor PU and the current PU.

In this way, information about the neighbor PU used in calculating the motion vector of the current PU, and information about the difference in distance and attribute from the neighbor PU and a reference for distance calculation may be signaled.

Figure 19:
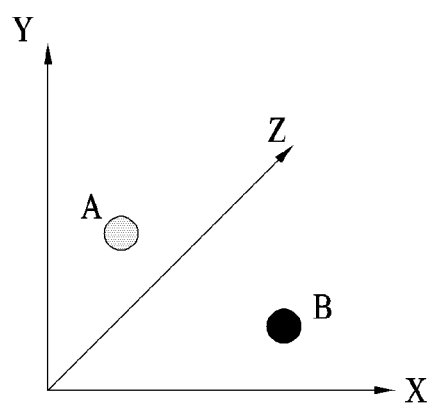
FIG. 19 illustrates presenting point cloud data in a spatial coordinate system and a spherical coordinate system according to embodiments.

FIG. 19 illustrates a method for measuring similarity between a neighbor PU and a current PU. Points A and B may be points included in the current PU or the neighbor PU, respectively.

The similarity between the current PU and the neighbor PU may be calculated based on the Euclidean distance, Manhattan distance, Cosine similarity, and the like. Similarity may be calculated based on the coordinates of the center of each PU. In addition, the similarity may be calculated based on the position of a vertex previously set in the PU. The equations for the above-described similarity measurement methods are given below.

1) Euclidean distance $$\sqrt{\Sigma_{i=1}^{n}(A_i-B_i)^2}$$

2) Manhattan distance $$|\Sigma_{i=1}^{n}A_i-B_i|$$

3) Cosine Similarity $$\cos(\theta) = \frac{AB}{\|A\|\|B\|}$$

In calculating the motion vector of the current PU, a threshold may be set. Only when the distance between the current PU and previously coded neighbor PUs is less than or equal to the threshold, the similarity to the corresponding neighbor PUs may be reflected as a weight in motion vector calculation. That is, a neighbor PU having a distance less than a specific threshold may be used for motion estimation. In addition, a predetermined number of PUs may be selected from among the nearest neighbor PUs and used for motion estimation.

When there is no previously coded neighbor PU, motion vector estimation may be performed on a single PU in a conventional manner Although the motion estimation method for the current PU has been described, the method may also be applied to units such as a coding unit, a transform unit, a slice, a brick, and a tile.

Figure 20:
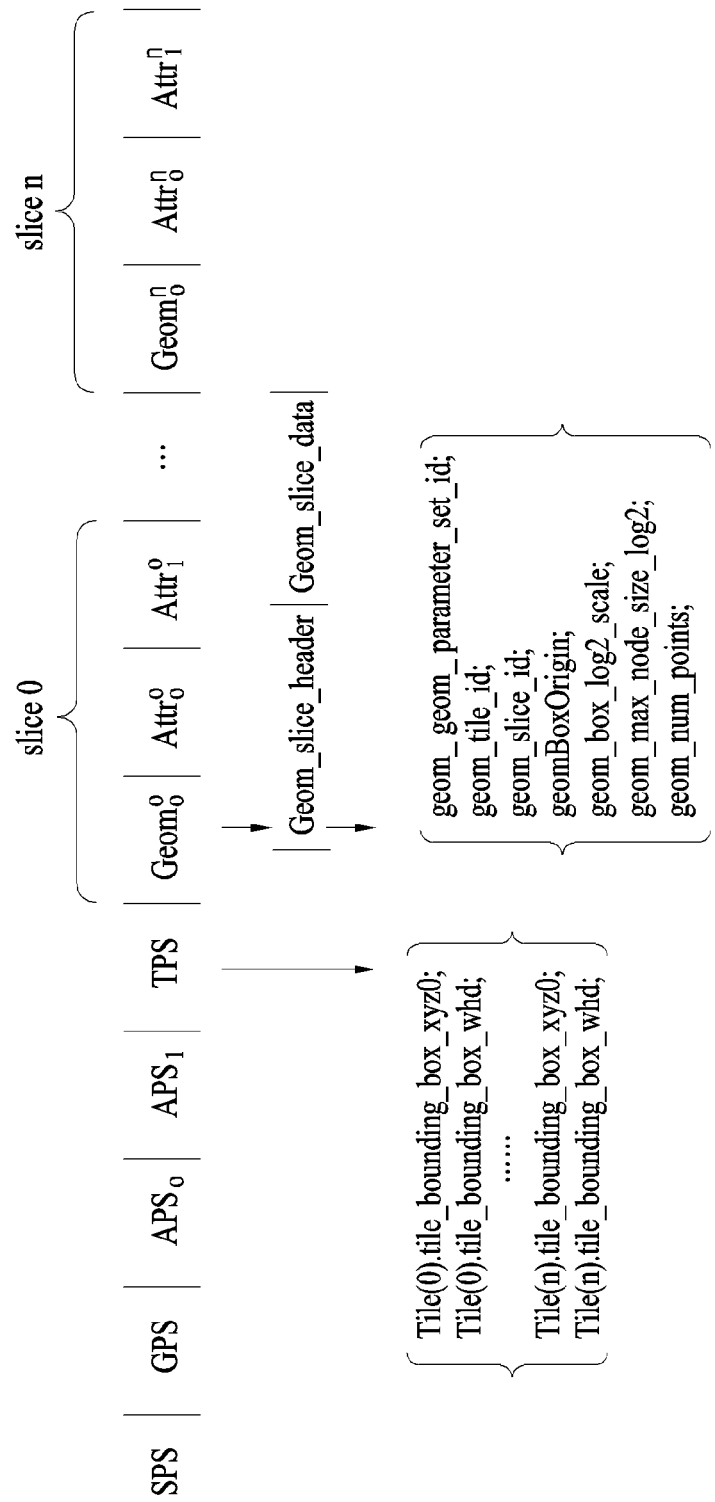
FIG. 20 illustrates an example of encoded point cloud data according to embodiments.

FIG. 20 shows an example of encoded point cloud data according to embodiments. The point cloud video encoder 10002 may encode point cloud data in the encoding operation 20001, and the transmitter 10003 may transmit a bitstream containing the encoded point cloud data to the reception device 10004.

The encoded point cloud data (bitstream) according to the embodiments may be generated by hardware including one or more processors or integrated circuits configured to communicate with the point cloud video encoder 10002 of FIG. 1, the encoding of FIG. 2, the transmission device of FIG. 12, the XR device 1430 of FIG. 14, and/or one or more memories, software, firmware, or a combination thereof.

Also, the encoded point cloud data (bitstream) according to the embodiments may be decoded by hardware including one or more processors or integrated circuits configured to communicate with the point cloud video decoder 10006 of FIG. 1, the decoding 20003 of FIG. 2, the decoder of FIG. 11, the transmission device of FIG. 13, the XR device 1430, and/or one or more memories, software, firmware, or a combination thereof.

A device and method for processing point cloud data according to embodiments may signal motion vector information related to a neighbor PU.

The abbreviations shown in FIG. 20 have the following meanings.

SPS: Sequence Parameter Set;
GPS: Geometry Parameter Set;
APS: Attribute Parameter Set;
TPS: Tile Parameter Set;
Geom: Geometry bitstream=geometry slice header+geometry slice data;
Attr: Attribute bitstream=attribute brick header+attribute brick data.

Tiles or slices may be provided such that the point cloud data may be divided into regions and processed. When the point cloud data is divided into regions, the importance of each region may be set differently. Accordingly, by allowing different filters or different filter units to be applied according to importance, a filtering method having high complexity but good result quality may be used for an important region.

In addition, instead of using a complex filtering method for the entire point cloud data, a different filtering method may be applied to each region (divided into tiles or slices) depending on the processing capacity of the reception device. Therefore, an improved image quality may be ensured for important regions and appropriate latency may be ensured for the system. That is, when the region of the point cloud data is divided into tiles, a different filter or a different filter unit may be applied to each tile. Also, when the region of the point cloud data is divided into slices, a different filter or a different filter unit may be applied to each slice.

In this embodiment, for a method of using information about a coded neighbor having a motion vector for motion estimation, all or part of related information may be transmitted in a sequence parameter set. In addition, the information may be transmitted in a geometry parameter set, an attribute parameter set, a tile parameter set, a slice header, an SEI message, or the like.

In addition, a corresponding position or a separate position may be defined depending on the application or system, and the range and method may be applied differently. When the syntax element defined below is applicable to a plurality of point cloud data streams as well as the current point cloud data stream, the information may be transferred in a higher-level parameter set.

Hereinafter, parameters (metadata, signaling information, etc.) according to embodiments may be generated during a process of a transmission device according to embodiments to be described later, and may be transmitted to a reception device according to embodiments and used in a reconstruction process. For example, the parameters may be generated by a metadata processor (or metadata generator) of the transmission device according to the embodiments to be described later, and acquired by a metadata parser of the reception device according to the embodiments.

The point cloud data transmission device according to the embodiments may insert, into each parameter set, information necessary for calculation of a motion vector of a current PU based on a motion vector of a neighbor PU, and signal the same to the reception device.

FIG. 21 shows an example syntax of a sequence parameter set according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, φ, θ), (r, φ, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PU[j] may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, parameters related to a sequence may be further transmitted in the SPS.

FIG. 22 shows an example syntax of a tile inventory according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, φ, θ), (r, φ, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PU[j] may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, parameters related to tiles may be further transmitted in the tile inventory.

FIG. 23 shows an example syntax of a geometry parameter set according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, φ, θ), (r, φ, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PU[j] may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, parameters related to geometry may be further transmitted in the GPS.

FIG. 24 shows an example syntax of an attribute parameter set according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, ϕ, θ), (r, ϕ, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PU[j] may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, parameters related to attributes may be further transmitted in the APS.

FIG. 25 shows an example syntax of a slice header of a geometry bitstream according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, $\phi$, $\theta$), (r, $\phi$, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PUW may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, parameters related to a geometry slice may be further transmitted in the slice header of Geom.

FIG. 26 shows an example syntax of NPI_parameter_set according to embodiments.

Num_PU may indicate the total number of PUs included in a frame. As many syntax elements described below as the value of Num_PU may be generated by a 'for' loop.

PU_index[i] may indicate an index representing each PU, and there may be as many indexes as num_PU. PU_index[i] may indicate the i-th PU_index among the num_PU PU indexes (PU_index).

PU_coordinates[i] may indicate representative values of a position of the i-th PU predefined to indicate the position of the PU. The position value may be (X, Y, Z), (r, $\phi$, $\theta$), (r, $\phi$, laser index), (x, y, laser index), or the like.

PU_size[i] may indicate the size of the i-th PU based on PU_coordinates. It may include information such as (width, height, depth), and may be replaced with any information that may indicate PU_size.

use_coded_neighbour_PU_flag[i] may indicate whether to use the information about the previously coded neighbor PU for estimation of the motion vector of the i-th PU. 1 indicates that the motion vector of the current PU is predicted based on the motion vector information about the coded neighbor PU, and 0 indicates that the motion vector is predicted for a single PU without neighbor information.

num_neighbour_PU indicates the number of coded neighbor PUs at the position of the current PU when information about the coded neighbor PU is used for estimation of the motion vector of the current PU.

threshold_neighbour_criteria indicates a criterion for classification of a neighbor PU to be used for motion vector estimation of the current PU. The corresponding value may indicate classification based on a distance, or classification for selecting k PUs as neighbors in order of the nearest PUs by defining an integer value.

Distance_to_current_PU[j] may indicate the distance between PU_index[i], which is the current PU, and the j-th PU among the PUs classified as neighbor PUs. By using a 'for' loop, as many distances as the value of num_neighbour_PU may be generated.

neighbour_PU_index[j] may represent an index indicating a neighbor PU and indicates the j-th PU among PUs classified as neighbor PUs. The index information may be replaced with index information representing a specific PU among all PUs, and may be signaled as a separate index for each corresponding PU. Indexes may be generated as many as the value of num_neighbour_PU using a 'for' loop.

motion_vector[j] may be 3D information indicating a motion vector corresponding to the j-th neighbour_PU whose value of Distance_to_current_PU is less than threshold_neighbour_criteria. That is, the motion_vector[j] indicates the motion vector of the j-th neighbor PU when the distance of the j-th neighbor PU is less than the neighbor classification criterion.

Attribute_neighbour_info[j] may include representative attribute information corresponding to the j-th neighbour_PU when attribute information is simultaneously reflected in motion vector estimation. The attribute information may be reflectance and/or color information. When there is one or more pieces of attribute information, a representative attribute value such as arithmetic mean or geometric mean may be signaled. That is, when the distance of the j-th neighbor PU is less than the neighbor classification criterion, the Attribute_neighbour_info[j] indicates attribute information about the j-th neighbor PU.

When use_coded_neighbour_PU_flag[i] is 0, that is, when the information about a neighbor PU is not used, the following syntax value may be transmitted.

searching_pattern signals search pattern information in order to perform motion vector estimation for a single PU.

Amotion indicates a motion amount value that is multiplied by a search pattern for motion estimation. Each time motion estimation is repeated, Amotion may be reduced by half.

motion_precision indicates the minimum value of the motion amount multiplied by a search pattern for motion estimation. In performing motion estimating, Amotion gradually decreases, but it does not become less than the minimum value of motion_precision.

In addition, the NPI parameter set may further include and carry related parameters.

Figure 27:
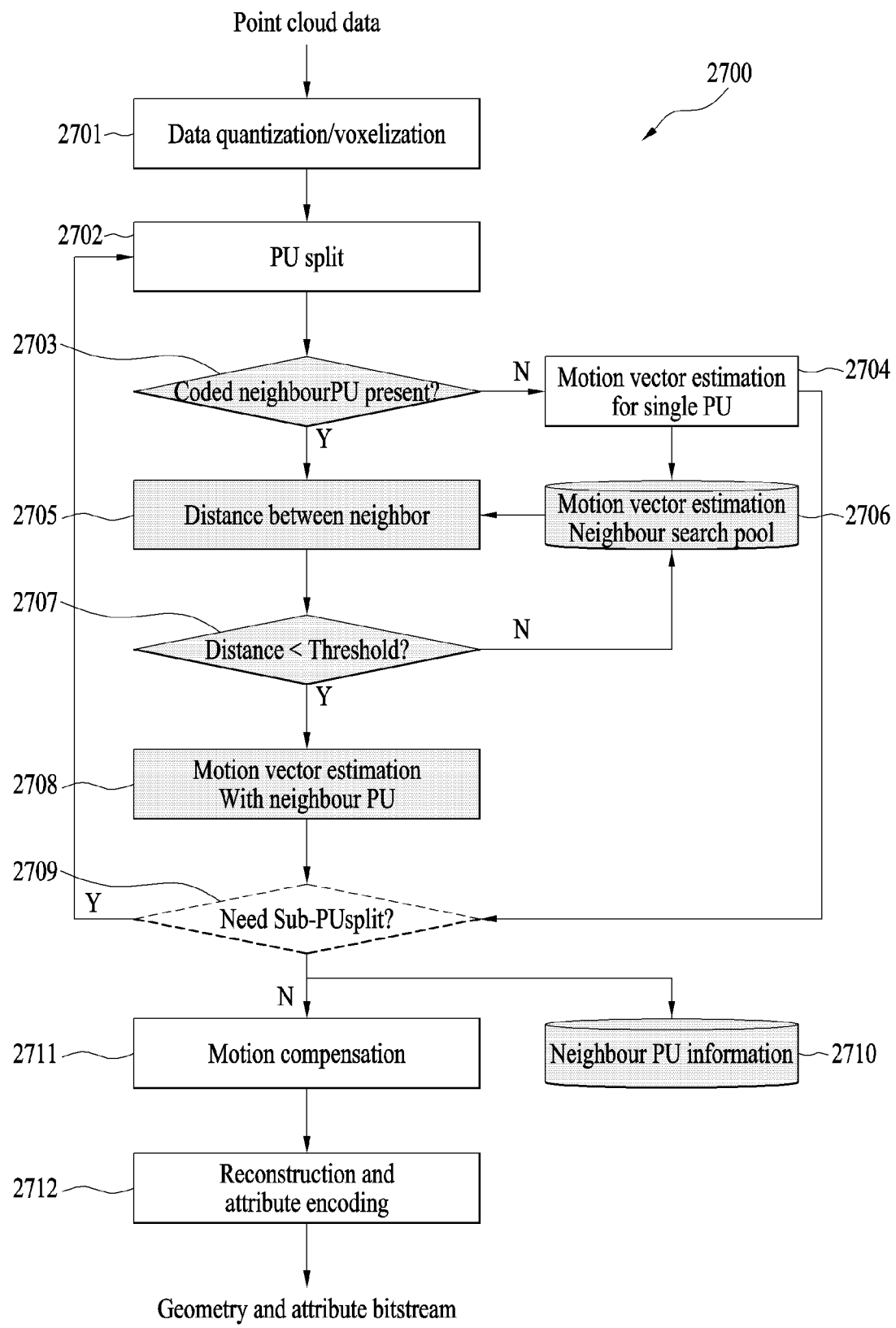
FIG. 27 is a flow diagram illustrating an example of a method of processing point cloud data according to embodiments.

FIG. 27 is a flow diagram illustrating an example of a method of processing point cloud data according to embodiments.

The flow diagram 2700 of FIG. 27 illustrates a processing method carried out by the point cloud data transmission device described with reference to FIGS. 15 to 26 (e.g., the point cloud data transmission device, point cloud encoder, geometry encoder, etc. described with reference to FIGS. 1 to 14). The point cloud processing method illustrated in the figure represents the method of calculating a motion vector of a current PU based on the motion vector of a neighbor PU described with reference to FIGS. 15 to 18. In the processing method illustrated in the figure, the respective operations may be performed sequentially, or at least one or more thereof may be performed simultaneously. The processing order of the operations may be changed.

The point cloud data processing device (e.g., the geometry encoder) according to the embodiments receives point cloud data as an input and performs data quantization/voxelization to facilitate compression of the geometry of the input point cloud data (2701).

The point cloud data processing device according to the embodiments may include at least one of the coordinate transformer 40000, the quantizer 40001, the octree analyzer 40002, the surface approximation analyzer 40003, the arithmetic encoder 40004, and the geometry reconstructor 40005 described with reference to FIG. 4. The point cloud data processing device according to the embodiments may include at least one of the data input unit 12000, the quantization processor 12001, the voxelization processor 12002, the octree occupancy code generator 12003, and the surface model processor 12004, the intra/inter-coding processor 12005, and the arithmetic coder 12006 described with reference to FIG. 12. Although not shown in the figures, the point cloud data processing device may be implemented by hardware including one or more processors or integrated circuits configured to communicate with one or more memories included in the point cloud providing device, software, firmware, or a combination thereof.

The point cloud data processing device (e.g., the geometry encoder) according to the embodiments performs spatial partitioning in prediction units (PUs) (2702). The spatial partitioning 2702 according to the embodiments may be included in the geometry encoding process described with reference to FIGS. 1 to 15. The spatial partitioning 2702 may be performed by the spatial partitioner 1511 shown in FIG. 15A. The spatial partitioning 2702 according to the embodiments includes the following operations. The point cloud data processing device determines whether to perform spatial partitioning on the entire frame or a specific node size in the octree structure. When it determines the PU split range or search range, the device may identify the characteristic of the distribution of point cloud data in the corresponding region and determine a PU split range (search range) and axis (axes). Information related to the spatial partitioning may be signaled at various levels such as a sequence level and a tile level by a bitstreams.

The point cloud data processing device performs motion estimation for each split PU or sub PU. In this operation, the point cloud data processing device checks (searches for) presence of a pre-encoded neighbor PU for the current PU (2703).

When there is no neighbor PU, motion vector estimation is performed for a single PU (2704). Further, the PU for which motion vector estimation has been performed is stored in a search pool 2706 and may be used as a neighbor PU when motion vector estimation is performed for another PU.

When there is a neighbor PU, the similarity between the neighbor PU and the current PU is checked by invoking the information about the neighbor PU in the search pool 2706 (2705). The similarity may be calculated based on the distance between the neighbor PU and the current PU. That is, the point cloud data processing device may generate a motion vector of the current PU based on the motion vector of the neighbor PU in response to whether the neighbor PU for the current PU is searched for. In addition, the similarity may be calculated based on other information such as attribute information (reflectance, color, etc.) as well as the distance between the current PU and the neighbor PU. Then, based on the calculated similarity, neighbor PUs used for motion estimation may be limited. That is, by setting a similarity threshold, the neighbor PU may be used for motion estimation only when the similarity of the neighbor PU falls within a predetermined range.

FIG. 27 illustrates an embodiment of calculating the similarity of a neighbor PU based on a distance. When there is a neighbor PU, the distance between the current PU and the neighbor PU is calculated (2705). Then, it is checked whether the calculated distance is less than a threshold (2706). When the neighbor PU is sufficiently close to the current PU, namely, when the calculated distance of the neighbor PU is less than the threshold, a motion vector of the current PU is generated based on the motion vector of the neighbor PU (2708). When the distance of the neighbor PU is greater than the threshold, it is not used for motion estimation, but may be stored in the search pool again. The threshold may be set to an appropriate value by the user, and there may be multiple neighbor PUs. In addition, the motion vector of the current PU may be generated by limiting the number of neighbor PUs closest to the current PU as well as limiting the use of the neighbor PUs by similarity.

When the motion estimation is completed, it is determined whether each PU or sub PU is to be additionally split (2709). Whether to perform additional splitting is determined by comparing the RDO costs. That is, if the sum computed by calculating the RDO costs of the sub PUs is less than the RDO cost of the previous PU, the PU is finally split into sub PUs. Otherwise, splitting is not performed.

When additional splitting is performed, the point cloud data processing device returns to the PU splitting operation and repeats the above-described operations. When the additional splitting is skipped, the point cloud data processing device completes motion estimation for each PU, and then performs motion compensation using an acquired motion vector (2711). In this operation, information about the neighbor PU may be stored (2710) and transmitted to the reception device. Then, attribute encoding may be performed based on the reconstructed geometry (or reconstructed point cloud data) (2712). In the attribute encoding, a residual between the source data and the predicted data may be transformed, quantized, and encoded through entropy coding.

Figure 28:
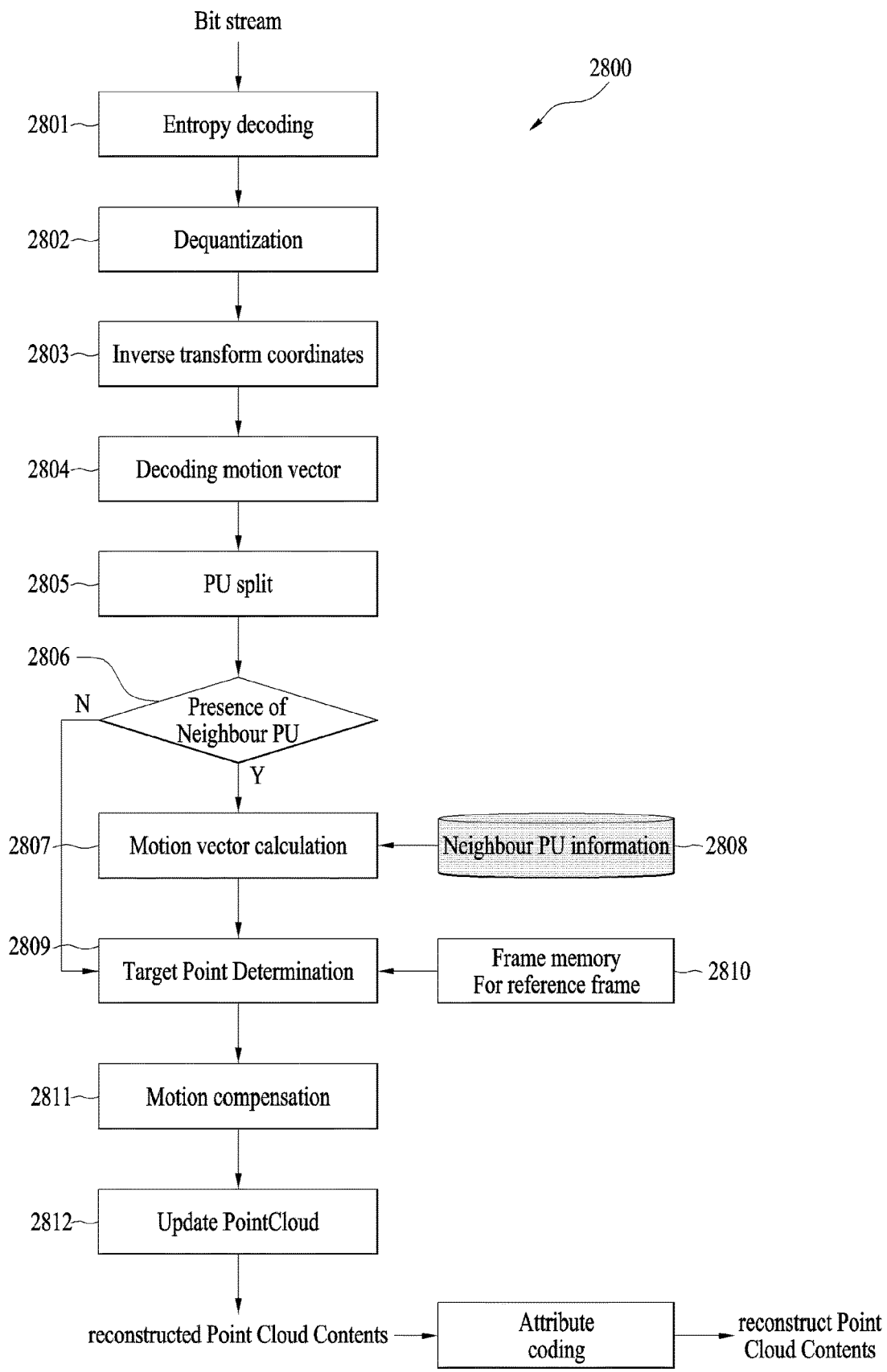
FIG. 28 is a flow diagram illustrating an example of a method of processing point cloud data according to embodiments.

FIG. 28 is a flow diagram illustrating an example of a method of processing point cloud data according to embodiments. The flow diagram 2800 of FIG. 28 illustrates a method of processing by the point cloud data reception device described with reference to FIGS. 15 to 26 (e.g., the point cloud data reception device, the point cloud decoder, the geometry decoder, the attribute decoder, or the like described with reference to FIGS. 1 to 14).

The point cloud data processing device (e.g., the geometry decoder) according to the embodiments may perform entropy decoding 2801, dequantization 2802, and inverse transformation 2803 on the geometry contained in the received bitstream to reconstruct the residuals, which are prediction errors for the respective points. Then, the motion vector may be decoded (2804), and the space may be partitioned into PUs (2805). Here, the spatial partitioning 2805 may be performed by the spatial partitioner 1521 shown in FIG. 15B. The point cloud data processing device according to the embodiments may include at least one of the arithmetic decoder 13002, the occupancy code-based octree reconstruction processor 13003, the surface model processor 13004, and the inverse quantization processor 13005 described with reference to FIG. 13. Although not shown in the figures, the point cloud data processing device may be implemented by hardware including one or more processors or integrated circuits configured to communicate with one or more memories included in the point cloud providing device, software, firmware, or a combination thereof.

In the method of processing point cloud data according to the embodiments illustrated in FIG. 28, it is determined whether to use neighbor PU information (2806). And, in the case of motion compensation using neighbor PU information, a motion vector is calculated (2807) by extracting corresponding information from the neighbor PU information received from the transmission device (2808). That is, in response to the motion compensation using the neighbor PU information, corresponding information is extracted from the neighbor PU information received from the transmission device (2808) to calculate a motion vector (2807). The neighbor PU information may be motion vector information, position information, or attribute information related to the neighbor PU. In addition, in the motion vector calculation 2807, the motion vector of the current PU is calculated based on the received information related to the neighbor PU. In calculating a motion vector, the calculation may be performed by applying distance-based or attribute-based weights. After the motion vector information is determined, a target point for motion compensation is selected (2809), the motion compensation is performed (2811), and then the value is replaced with a point cloud at the corresponding position (2812).

The reconstructed point cloud geometry reconstructed with predicted information for points in the PU range of the current frame with the motion vector information transmitted for each PU may be stored in a frame memory and may be used as data prediction information in the PU range of the next frame. When geometry data reconstruction is completed, colors may be inversely transformed to include attribute data at the corresponding position. Based on the reconstructed geometry and attributes, reconstructed point cloud contents are delivered to the renderer. The processing method corresponding to respective operations shown in the figure may be performed sequentially. However, one or more operations may be performed at the same time, and the processing order thereof may be changed.

Figure 29:
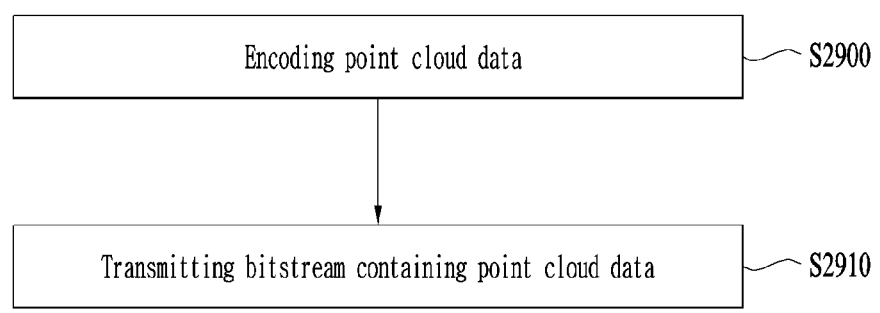
FIG. 29 illustrates an example of a point cloud data transmission method according to embodiments.

FIG. 29 illustrates an example of a point cloud data transmission method according to embodiments. The transmission device 10000 according to the embodiments may include encoding point cloud data (S2900) and transmitting a bitstream containing the point cloud data (S2910).

In operation S2900 of encoding the point cloud data, the point cloud data may be encoded by the point cloud video encoder 10002 in FIG. 1, the encoding 20001 in FIG. 2, the encoder in FIG. 4, the transmission device in FIG. 12, the XR device 1430 in FIG. 14, the transmission device 1510 in FIG. 15A, and/or hardware including one or more processors or integrated circuits configured to communicate with one or more memories, software, firmware, or a combination thereof.

More specifically, operation S2900 of encoding the point cloud data may include encoding geometry data of the point cloud data and encoding attribute data of the point cloud data.

Operation S2910 of transmitting the bitstream containing the point cloud data includes the transmitter 10003 of FIG. 1 is a step of transmitting the point cloud data as in the transmission 20002 of FIG. 2 by the transmitter 10003 in FIG. 1, the transmission processor 12012 in FIG. 12, the XR device 1430 in FIG. 14, the transmission device 1510 in FIG. 15A, and/or hardware including one or more processors or integrated circuits configured to communicate with one or more memories, software, firmware, or a combination thereof.

Figure 30:
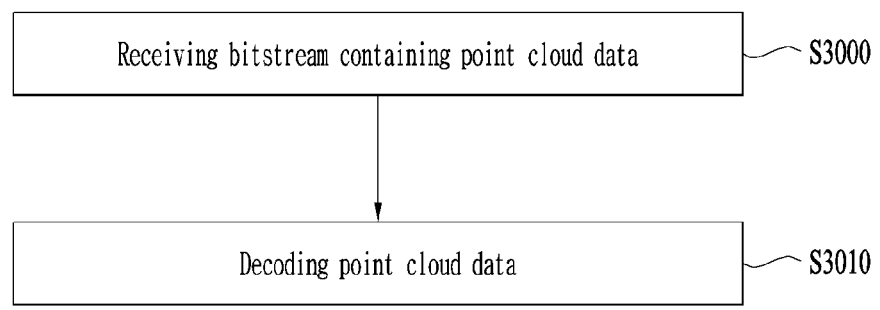
FIG. 30 illustrates an example of a point cloud data reception method according to embodiments.

FIG. 30 illustrates an example of a point cloud data reception method according to embodiments. The reception method may include receiving a bitstream containing point cloud data (S3000) and decoding the point cloud data (S3010).

In operation S3000 of receiving the bitstream containing the point cloud data, the point cloud data is received by the reception device 10004 in FIG. 1, the reception device in FIGS. 10 and 11, the receiver 13000 in FIG. 13, the XR device 1430 in FIG. 14, the reception device 1520 in FIG. 15B, and/or hardware including one or more processors or integrated circuits configured to communicate with one or more memories, software, firmware, or a combination thereof.

In operation S3010 of decoding the point cloud data, the point cloud data is decoded by the point cloud video decoder 10006 in FIG. 1, the reception device in FIGS. 10, 11, and 13, the XR device 1430 in FIG. 14, and/or hardware including one or more processors or integrated circuits configured to communicate with one or more memories, software, firmware, or a combination thereof.

The decoding of the point cloud data may include decoding geometry data of the point cloud data and decoding attribute data of the point cloud data.

The reception device according to the embodiments may receive, decode and render the point cloud data by the reception device 10004 in FIG. 1, the reception device in FIG. 11, FIG. 13, the XR device 1430 in FIG. 14, the reception device 1520 in FIG. 15B, and/or hardware including one or more processors or integrated circuits configured to communicate with one or more memories, software, firmware, or a combination thereof.

The reception device according to the embodiments includes a receiver configured to receive point cloud data, a decoder configured to decode the point cloud data, and a renderer configured to render the point cloud data.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same.

Executable instructions for performing the method/operations of the device according to the embodiments may be stored in a non-transitory CRM or other computer program products configured to be executed by one or more processors, or may be stored in a transitory CRM or other computer program products configured to be executed by one or more processors.

In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system. It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

What is claimed is:

1. A method of encoding point cloud data, the method comprising:
   encoding geometry data of point cloud data; and
   encoding attribute data of the point cloud data,
   wherein the encoding of the geometry data includes:
   predicting the geometry data based on motion compensated reference information,
   wherein the motion compensated reference information is derived based on thresholds used to determine reference points to which motion compensation is applied,
   wherein the geometry data and the attribute data are included in a bitstream including information related to the thresholds.

2. The method of claim 1, further comprising:
   voxelizing the geometry data;
   splitting the geometry data into at least one prediction unit (PU); and
   generating a motion vector of the PU.

3. The method of claim 2, wherein the generating of the motion vector of the PU comprises:
   searching for a neighbor PU for at least one current PU;
   in response to the searching of the neighbor PU, generating a motion vector of the current PU based on a motion vector of the neighbor PU.

4. The method of claim 3, wherein the generating of the motion vector of the current PU comprises:
   generating the motion vector of the current PU based on an arithmetic average of motion vectors of the neighbor PU.

5. The method of claim 4, further comprising:
   performing motion compensation for the current PU,
   wherein the bitstream contains information about the neighbor PU for the current PU.

6. The method of claim 3, wherein the generating of the motion vector of the current PU comprises:
   generating the motion vector of the current PU based on a difference between attribute information related to the neighbor PU and attribute information related to the current PU.

7. A device for encoding point cloud data, the device comprising:
   a memory; and
   at least one processor connected to the memory, the at least one processor configured to:
   encode geometry data of point cloud data; and
   encode attribute data of the point cloud data,
   wherein the at least one processor is further configured to:
   predict the geometry data based on motion compensated reference information,
   wherein the motion compensated reference information is derived based on thresholds used to determine reference points to which motion compensation is applied,
   wherein the geometry data and the attribute data are included in a bitstream including information related to the thresholds.

8. The device of claim 7, wherein the at least one processor is further configured to:
   split the geometry data into at least one prediction unit (PU), and
   generate a motion vector of the PU to encode the geometry data.

9. The device of claim 8, wherein the at least one processor is further configured to:
   search for a neighbor PU for at least one current PU;
   in response to the searching of the neighbor PU, generate a motion vector of the current PU based on a motion vector of the neighbor PU.

10. The device of claim 8, wherein the at least one processor is further configured to generate the motion vector of the current PU based on an arithmetic average of motion vectors of the neighbor PU.

11. The device of claim 8, wherein the at least one processor is further configured to generate the motion vector of the current PU based on a difference between attribute information related to the neighbor PU and attribute information related to the current PU.

12. A method of decoding point cloud data, the method comprising:
   decoding geometry data of point cloud data in a bitstream; and
   decoding attribute data of the point cloud data,
   wherein the decoding of the geometry data includes:
   predicting the geometry data based on motion compensated reference information,
   wherein the motion compensated reference information is derived based on thresholds used to determine reference points to which motion compensation is applied,
   wherein the bitstream includes information related to the thresholds.

13. The method of claim 12, wherein the bitstream contains information related to splitting of a prediction unit and signaling information about a neighbor prediction unit related to a current prediction unit,
   the method further comprising:
   splitting the geometry data into at least one prediction unit based on the information related to splitting of the prediction unit.

14. The method of claim 13, wherein the decoding of the geometry data comprises:
   generating a motion vector of the current prediction unit based on a motion vector of the neighbor prediction unit related to the current prediction unit.

15. The method of claim 14, wherein the generating of the motion vector of the current prediction unit comprises:
   generating the motion vector of the current prediction unit based on an arithmetic average of motion vectors of the neighbor prediction unit.

16. The method of claim 14, wherein the generating of the motion vector of the current prediction unit comprises:
   generating the motion vector of the current prediction unit based on a difference between attribute information related to the neighbor prediction unit and attribute information related to the current prediction unit.

17. A device for decoding point cloud data, the device comprising:
a memory; and
at least one processor connected to the memory, the at least one processor configured to:
decode geometry data of point cloud data in a bitstream; and
decode attribute data of the point cloud data,
wherein the at least one processor is further configured to:
predict the geometry data based on motion compensated reference information,
wherein the motion compensated reference information is derived based on thresholds used to determine reference points to which motion compensation is applied,
wherein the bitstream includes information related to the thresholds.

18. The device of claim 17, wherein the bitstream contains information related to splitting of a prediction unit and signaling information about a neighbor prediction unit related to a current prediction unit,
wherein the at least one processor is further configured to split the geometry data into at least one prediction unit based on the information related to splitting of the prediction unit.

19. The device of claim 18, wherein the at least one processor is further configured to, based on a motion vector of the neighbor prediction unit related to at least one current prediction unit, a motion vector of the current prediction unit.

20. The device of claim 19, wherein the at least one processor is further configured to generate the motion vector of the current prediction unit based on an arithmetic average of motion vectors of the neighbor prediction unit.

21. The device of claim 19, wherein the at least one processor is further configured to generate the motion vector of the current prediction unit based on a difference between attribute information related to the neighbor prediction unit and attribute information related to the current prediction unit.

* * * * *